United States Patent
Kumai et al.

(10) Patent No.: US 8,391,210 B2
(45) Date of Patent: Mar. 5, 2013

(54) RADIO COMMUNICATION SYSTEM AND RADIO TRANSMISSION PATH CONTROL METHOD

(75) Inventors: Hisao Kumai, Osaki (JP); Shohei Yamada, Osaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 676 days.

(21) Appl. No.: 12/519,128

(22) PCT Filed: Dec. 13, 2007

(86) PCT No.: PCT/JP2007/074004
§ 371 (c)(1),
(2), (4) Date: Jun. 12, 2009

(87) PCT Pub. No.: WO2008/072687
PCT Pub. Date: Jun. 19, 2008

(65) Prior Publication Data
US 2010/0020767 A1    Jan. 28, 2010

(30) Foreign Application Priority Data

Dec. 15, 2006  (JP) ................................ 2006-338752
Apr. 6, 2007   (JP) ................................ 2007-100552

(51) Int. Cl.
    *H04W 4/00* (2009.01)
(52) U.S. Cl. ........................................ 370/328; 370/331
(58) Field of Classification Search .................. 370/331, 370/328
    See application file for complete search history.

(56) References Cited

U.S. PATENT DOCUMENTS

| | | | |
|---|---|---|---|
| 6,931,253 B1 * | 8/2005 | Hartikainen et al. | 455/450 |
| 2003/0104813 A1 * | 6/2003 | Julka et al. | 455/436 |
| 2003/0114158 A1 * | 6/2003 | Soderbacka et al. | 455/436 |
| 2004/0266437 A1 * | 12/2004 | Vempati et al. | 455/436 |
| 2005/0163093 A1 | 7/2005 | Garg et al. | |
| 2006/0039335 A1 | 2/2006 | Ono et al. | |
| 2007/0110009 A1 | 5/2007 | Bachmann et al. | |
| 2007/0147315 A1 | 6/2007 | Khoury et al. | |
| 2008/0013533 A1 * | 1/2008 | Bogineni et al. | 370/389 |

FOREIGN PATENT DOCUMENTS

| | | |
|---|---|---|
| JP | 2002-521938 A | 7/2002 |
| JP | 2005-229583 A | 8/2005 |
| JP | 2006-60579 A | 3/2006 |

(Continued)

OTHER PUBLICATIONS

3GPP TS 24.008 V7.7.0 (Mar. 2007), Release 7, pp. 208-230 and 309-322.
3GPP TS 23.060 V7.4.0 (Mar. 2007), Release 7, pp. 174-187.
3GPP TR 23.882 V1.11.0 (Jul. 2007), Release 7, pp. 32-71 and 130-133.
3GPP TS 23.401 V1.1.2 (Aug. 2007), Release 8, pp. 19-28 and 47-72.

(Continued)

*Primary Examiner* — Sai-Ming Chan
(74) *Attorney, Agent, or Firm* — Birch, Stewart, Kolasch & Birch, LLP

(57) ABSTRACT

An IP address is assigned to each of IP bearers, and a mobile anchor device (GWN) 33, which serves as an anchor in a mobile communication system, manages association among an identifier of a mobile terminal 7, those IP addresses, and identifiers that identify radio access means. A handover between different radio access networks 1 and 3 is implemented by assigning an IP address already used in a handover source IP bearer to a handover destination IP bearer. Accordingly, it is possible to provide a mobile communication system and a communication method for enabling a handover between radio transmission paths respectively established by different radio communication methods in a next generation mobile communication system.

20 Claims, 22 Drawing Sheets

Network configuration of mobile communication system

FOREIGN PATENT DOCUMENTS

| | | |
|---|---|---|
| WO | WO-2005/039114 A1 | 4/2005 |
| WO | WO-2005/051026 A1 | 6/2005 |
| WO | WO-2005/074159 A1 | 8/2005 |
| WO | WO-2005/083950 | 9/2005 |
| WO | WO 2006/130058 A1 | 12/2006 |

OTHER PUBLICATIONS

3GPP TS 23.402 V1.2.1 (Aug. 2007), Release 8, pp. 30-33.

Chinese Office Action dated Sep. 7, 2011 for Application No. 200780051394.1, with English Translation.

* cited by examiner

Configuration of mobile terminal

Functional configuration of RNS

Functional configuration of GWN

Handover sequence example 3

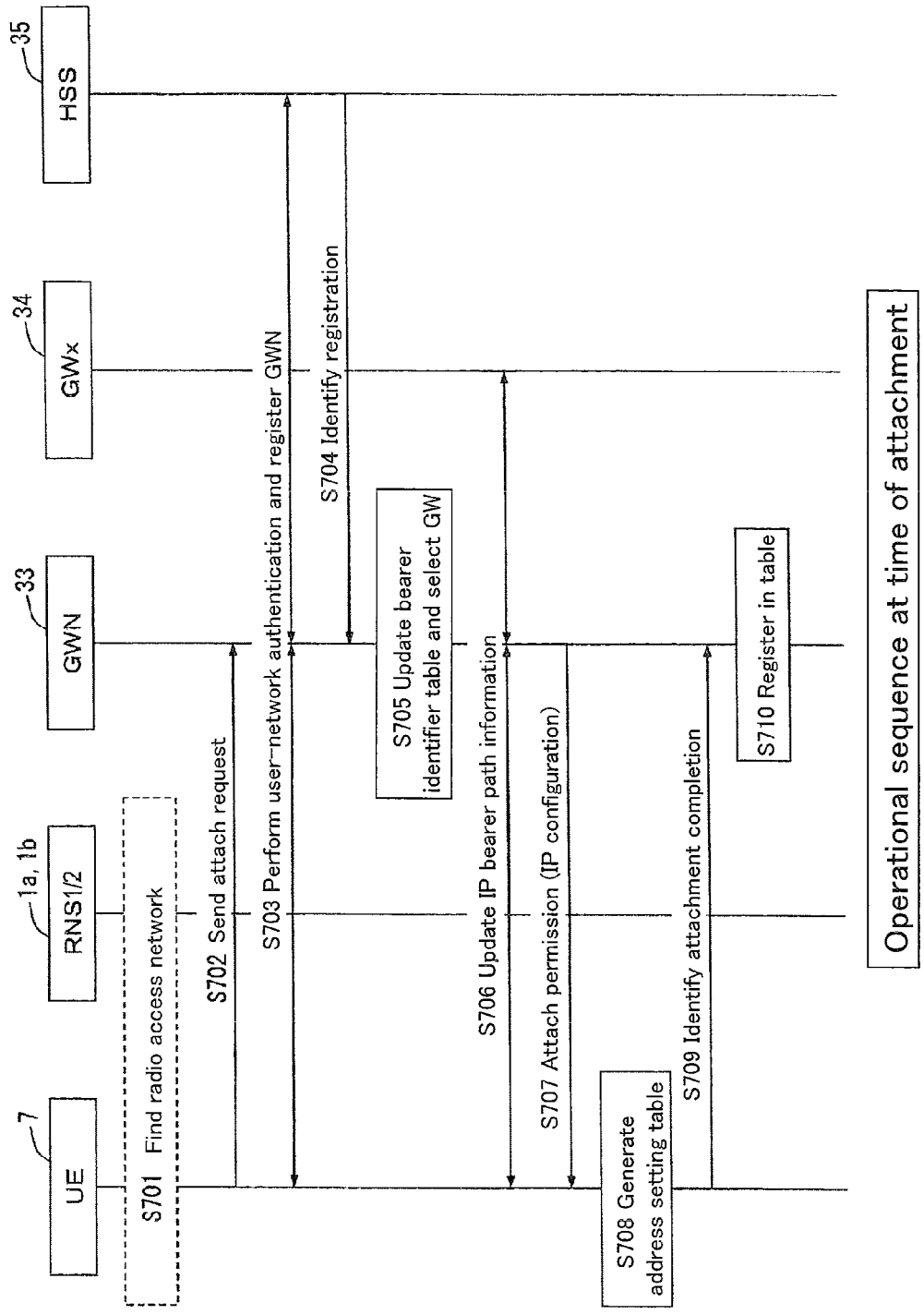

FIG. 4A
| UE-ID | |
|---|---|
| Address 1 | Address 2 |
| IF-ID1 | IF-ID2 |
Example of bearer identifier table at time of attachment
FIG. 4B
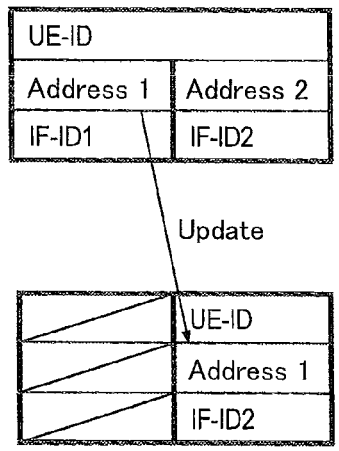
Example 1 of how to update bearer identifier table
FIG. 4C
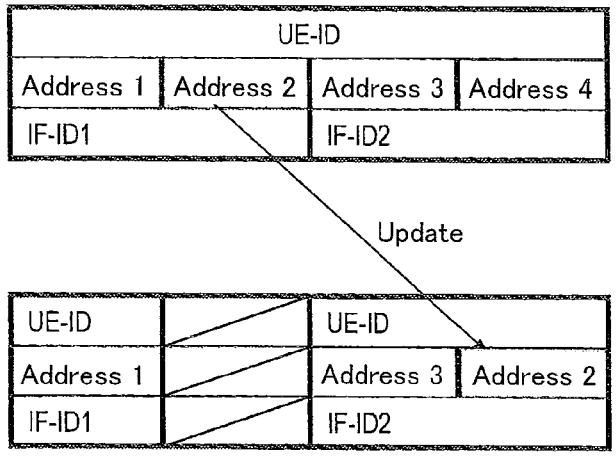
Example 2 of how to update bearer identifier table

FIG. 4D

| UE-ID | | | |
|---|---|---|---|
| Address A | | | |
| Bearer context 1 | Bearer context 2 | Bearer context 3 | Bearer context 4 |
| PLMN-ID1 | | PLMN-ID2 | |

Example of bearer identifier table at time of attachment

FIG. 4E

| UE-ID | | | |
|---|---|---|---|
| Address A | | | |
| Bearer context 1 | Bearer context 2 | Bearer context 3 | Bearer context 4 |
| PLMN-ID1 | | PLMN-ID2 | |

Update

| UE-ID | | | |
|---|---|---|---|
| Address A | | | |
| Bearer context 1 | | Bearer context 3 | Bearer context 2 |
| PLMN-ID1 | | PLMN-ID2 | |

Example of how to update bearer identifier table

FIG. 4F

| UE-ID | | | |
|---|---|---|---|
| Address A (GW1) | | Address B (GW2) | |
| Bearer context 11 | Bearer context 12 | Bearer context 21 | Bearer context 22 |
| IF-ID1 | IF-ID2 | IF-ID1 | IF-ID2 |

Example of bearer identifier table at time of attachment

FIG. 4G

| UE-ID |||||
|---|---|---|---|
| Address A (GW1) || Address B (GW2) ||
| Bearer context 11 | Bearer context 12 | Bearer context 21 | Bearer context 22 |
| IF-ID1 | IF-ID2 | IF-ID1 | IF-ID2 |

Not update          Update

| UE-ID ||||
|---|---|---|---|
| Address A (GW1) || Address B (GW2) ||
| Bearer context 11 | Bearer context 12 | Bearer context 21 | Bearer context 21 |
| IF-ID1 | IF-ID2 | IF-ID1 | IF-ID2 |

Example 1-1 of bearer identifier table at time of attachment
(Case of having bearer contexts, some of bearers are handed over)

FIG. 4H

| UE-ID ||||
|---|---|---|---|
| Address A (GW1) || Address B (GW2) ||
| Bearer context 11 | Bearer context 12 | Bearer context 21 | Bearer context 22 |
| IF-ID1 | IF-ID2 | IF-ID1 | IF-ID2 |

Update          Update

| UE-ID ||||
|---|---|---|---|
| Address A (GW1) || Address B (GW2) ||
| Bearer context 11 | Bearer context 11 | Bearer context 21 | Bearer context 21 |
| IF-ID1 | IF-ID2 | IF-ID1 | IF-ID2 |

Example 1-1 of bearer identifier table at time of attachment
(Case of having bearer contexts, all bearers are handed over)

Example of IP bearer settings at time of attachment

Example of how to change IP bearer settings
in handover sequence examples 1 and 3

Example of how to change IP bearer settings
in handover sequence examples 2 and 4

Example of IP bearer settings at time of attachment

Example of how to change IP bearer settings in handover sequence example

RADIO COMMUNICATION SYSTEM AND RADIO TRANSMISSION PATH CONTROL METHOD

TECHNICAL FIELD

The present invention relates to a mobile communication system including multiple radio communication means and to a method for controlling multiple radio transmission paths.

BACKGROUND ART

In the packet-switched domain in the UMTS (Universal Mobile Telecommunications System) standardized as a third generation mobile communication system, a UMTS bearer service (PDP (Packet Data Protocol) context) is specified as a bearer service model. The "PDP context" indicates information on settings of a logical path configuration used when user IP packets are transferred in the UMTS network. An address of a mobile terminal (UE) is called a PDP address. To access an IP network, the UE uses one of such one or more IP addresses respectively assigned by one or more GGSNs (Gateway GPRS Support Nodes), each of which is a node for connection from the mobile communication network to an external IP network.

Each GGSN is identified by an APN (Access Point Name). In the UMTS, each UE is assigned one or more PDP addresses (IP addresses assigned to a UE when PDP contexts are configured), and multiple PDP contexts can be simultaneously set up for each pair of an PDP address and an APN. In the case of setting up multiple PDP contexts, different GTP (GPRS Tunneling Protocol) tunnels can be related to the respective PDP contexts. Each GTP tunnel is assigned a tunnel endpoint identifier (TEID) serving as its identifier, and each UMTS bearer can be identified based on the TEID. The UE can connect to the external IP network by using these UMTS bearers (see Non-patent Documents 1 and 2).

Meanwhile, in the LTE (Long Term Evolution) & SAE (System Architecture Evolution) standardized as a next generation mobile communication system, an SAE bearer service is specified as in the UMTS, and a logical path configuration is set up by using PDP contexts in a similar manner. Standardization of the LTE & SAE is now being advanced so as to enable multiple bearers to be logically set up as in the UMTS by setting up a default bearer when a UE attaches to a mobile communication network, and by setting up a dedicated bearer in response to a request after the default bearer is set up. In addition, the above standardization is being advanced to enable exchange of information on the above settings at the time of a handover between the UMTS and the LTE & SAE (see Non-patent Document 3).

In addition, in the UMTS and next generation mobile communication systems, specified is a service model based on multiple service domain/external IP networks (PDNs) for allowing connection to the multiple PDNs that provide services. In the service model, it is defined that, to get services provided by the PDNs, a UE is connected to those multiple PDNs via Packet Data Network Gateways (PDN GWs), each of which is a gateway device between the corresponding PDN and a mobile network, and is assigned different PDP addresses (IP addresses assigned to a UE) by the respective PDN GWs (see Non-patent Documents 4 and 5).

[Non-patent Document 1] TS 24.008 Mobile radio interface Layer 3 specification; Core network protocols; Stage 3
[Non-patent Document 2] TS 23.060 General Packet Radio Service (GPRS); Service description; Stage 2
[Non-patent Document 3] TR 23.882 3GPP system architecture evolution (SAE): Report on technical options and conclusions
[Non-patent Document 4] TS 23.401 3GPP System Architecture Evolution:GPRS enhancements for LTE access
[Non-patent Document 5] TS 23.402 3GPP System Architecture Evolution:Architecture Enhancements for non-3GPP accesses

DISCLOSURE OF THE INVENTION

Problems To Be Solved By the Invention

However, it is still required for a future mobile communication system to include a mobile terminal including multiple radio communication means respectively supporting different communication methods such as second and third generation (2G and 3G) radio communication methods, a Super 3G (S3G) which is a next generation communication method, and a fourth generation (4G) communication method, and to enable a handover between those different radio communication means. The techniques disclosed in Non-patent Documents 1 and 2 described above allow identification of each UMTS bearer based on the corresponding TEID, but are not intended to make a distinction, for each bearer, as to which of the radio communication methods is used to establish a radio transmission path corresponding to the bearer, or to allow a handover between radio transmission paths respectively established by different radio communication methods. In addition, though Non-patent Documents 3 to 5 described above require that a handover between the UMTS and the SAE & LTE be enabled, no solving means therefor has been provided so far. This handover problem has not been solved in the case of providing a service based on multiple PDNs allowing connection to the multiple PDNs, either.

An object of the present invention is to provide a radio communication system and a radio transmission path control method for efficiently solving the various problems described above.

Means For Solving the Problems

According to an aspect of the present invention, provided is a mobile communication control system configured by including: multiple radio access network devices each formed of multiple radio network subsystems; a mobile terminal that includes a radio communication means enabling connection to the radio access network devices; and a mobile anchor device that connects the multiple radio access network devices to one another. The mobile communication control system is characterized in that the mobile anchor device has a function of managing a bearer identification table retaining relations between first addresses assigned to the radio communication means, and identifiers of the respective radio communication means.

An IP address is assigned to each of IP bearers, and a mobile anchor device, which serves as an anchor in a mobile communication system, manages association among an identifier of a mobile terminal, those IP addresses, and identifiers that identify radio access means. A handover between different radio access networks can be implemented by assigning an IP address already used in a handover source IP bearer to a handover destination IP bearer.

A bearer context is assigned to each of IP bearers, and a mobile anchor device, which serves as an anchor in a mobile communication system, manages association among an identifier of a mobile terminal, IP addresses, those bearer contexts and identifiers that identify radio access means. A handover between different radio access networks can be implemented by assigning information identifying at least a handover source IP bearer, such as a bearer context already used in the handover source IP bearer or the IP address assigned to the bearer, to a handover destination IP bearer.

According to another aspect of the present invention, a mobile terminal and a mobility management device manage a bearer identification table in which an identifier of the mobile terminal, IP addresses assigned to the mobile terminal, identifiers of its radio communication interfaces are associated with one another, or a bearer identification table in which the identifier of the mobile terminal, the IP addresses and bearer contexts assigned to the mobile terminal, identifiers of its radio communication interfaces are associated with one another. The mobility management device identifies IP bearers set up between the mobility management device and the mobile terminal by referring to the bearer identification table, and manages IP bearer mapping with respect to radio access networks. The mobility management device changes an IP bearer by updating only the identifiers of the radio communication means in accordance with a request.

This makes it possible to make a handover between different types of radio access networks without changing IP addresses used in applications on a mobile terminal.

The present invention encompasses a program for causing a computer to execute the above processing, and a computer-readable recording medium storing the program therein.

Effect of the Invention

In the mobile communication control method of the present invention, a bearer identification table is managed in which an identifier of a mobile terminal, IP addresses assigned to the mobile terminal, identifiers of radio communication means are associated with one another, and packet routing is changed by causing a mobility management device to refer to the table to update information identifying at least a handover source IP bearer, such as a bearer context assigned to the corresponding radio communication interface or the IP address assigned to the bearer. Accordingly, it is possible to make a handover between different types of radio transmission paths without changing applications on the mobile terminal.

BRIEF DESCRIPTION OF THE DRAWINGS

FIG. 3G is another operational sequence diagram at the time of attachment in the mobile communication system according to one of the embodiments.

FIG. 3H is a sequence diagram illustrating operations performed by constituent devices in the mobile communication system according to one of the embodiments when a handover trigger is generated via an RNS 1 at the time of a handover from the RNS 1a to an RNS 2a.

FIG. 4A shows a configuration example of a bearer identifier table at the time of attachment.

FIG. 4B shows a first example of how to update the bearer identifier table.

FIG. 4C shows a second example of how to update the bearer identifier table.

FIG. 4D shows an example of the bearer identifier table at the time of attachment.

FIG. 4E shows an example of how to update the bearer identifier table.

FIG. 4F shows an example of how to update the bearer identifier table.

FIG. 4G shows an example of the bearer identifier table at the time of a handover.

FIG. 4H shows an example of the bearer identifier table at the time of a handover.

DESCRIPTION OF SYMBOLS

A . . . mobile communication system, 1 . . . first radio access network, 1a . . . RNS1A, 3 . . . second radio access network, 5 . . . core network, 7 . . . mobile terminal, 11 . . . RNC, 15 and 17 . . . base station, 31 . . . the Internet, 33 . . . GWN, and 35 . . . HSS.

BEST MODES FOR CARRYING OUT THE INVENTION

Embodiment 1

Figure 1A:
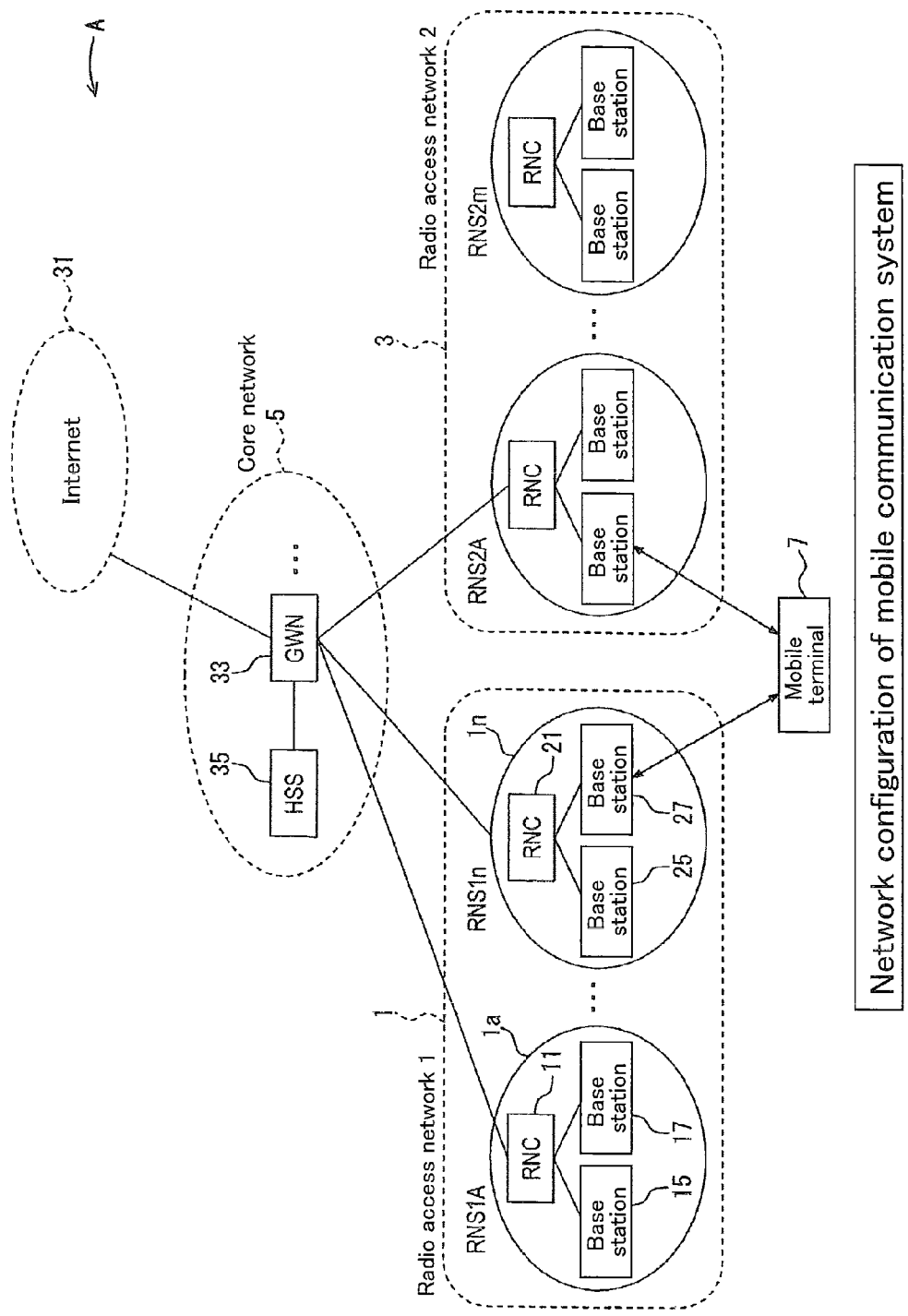
FIG. 1A shows a first network configuration example of a mobile communication system according to an embodiment of the present invention.
Figure 1B:
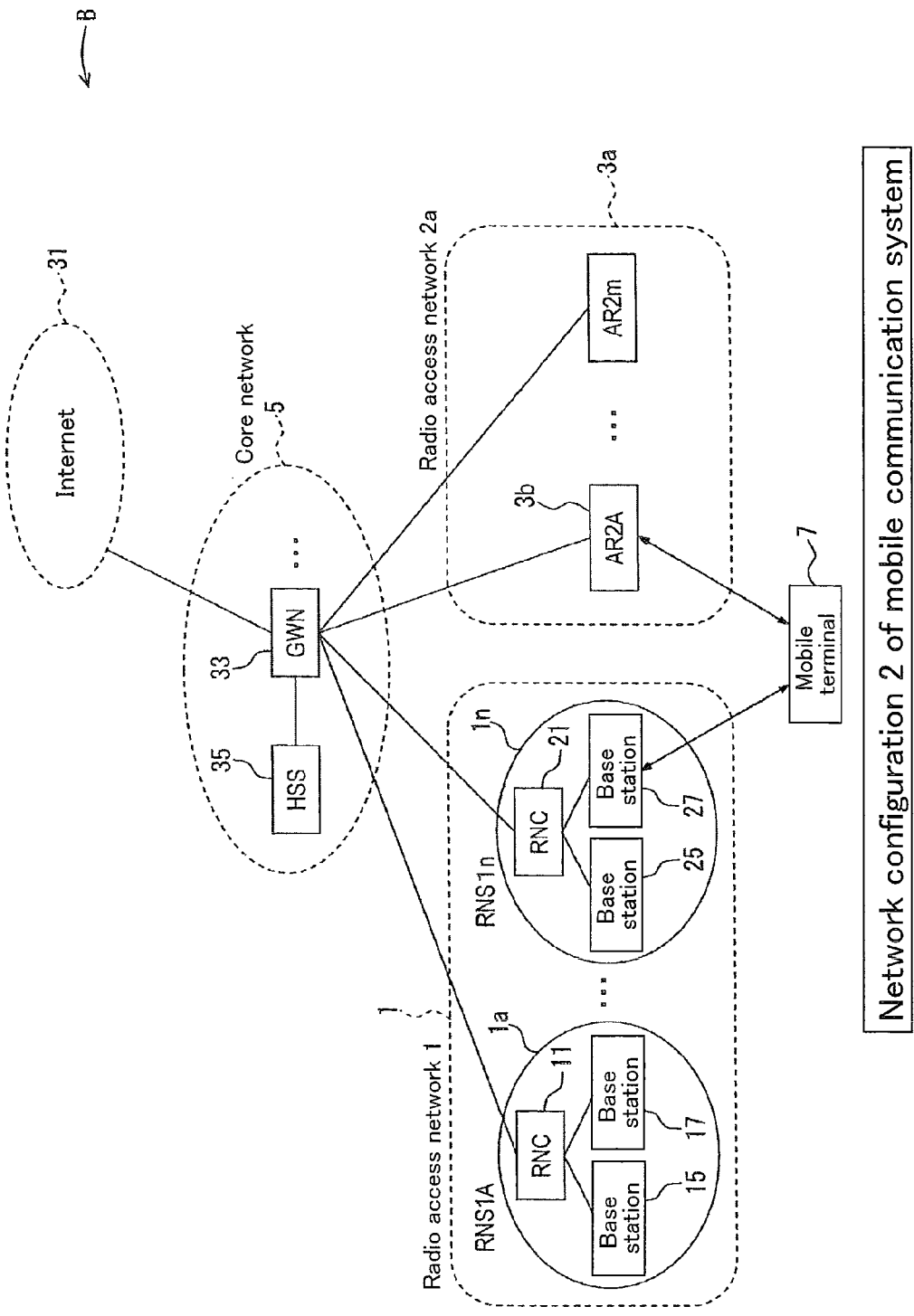
FIG. 1B shows a second network configuration example of a mobile communication system according to an embodiment of the present invention.

Firstly, a description will be given of network configuration examples of a mobile communication system according to an embodiment of the present invention with reference to FIGS. 1A and 1B. As shown in FIG. 1A, in a mobile communication system A, a UMTS functional architecture is divided into two parts: radio access networks (1 and 3), and a core network 5.

Radio resources required for requested communication, typified by a certain transmission band, are allocated to each of the radio access networks 1 and 3, through which user information is transferred between a mobile terminal 7 and the core network 5. Since different radio communication methods have different radio access networks, the radio communication method used in the first radio access network 1 is different from that in the second radio access network 3. Each of the first and second radio access networks 1 and 3 consists of multiple radio network subsystems (RNSs). Specifically, the first radio access network 1 consists of RNSs 1A to 1n, while the second radio access network 3 consists of RNSs 2A to 2m.

Furthermore, each RNS consists of a radio network controller (RNC) 11 and multiple base stations 15 and 17. The radio network controller 11 not only performs radio protocol control such as radio resource control, radio link control and media access control, but also performs management such as radio channel allocation by controlling the base stations 15 and 17. Though consisting of one RNC and multiple base stations in this configuration example, the RNS may alternatively be configured by integrating the functions of both the RNC and the base stations into one device. In other words, the RNS may have any configuration as long as based on one or more devices that serve as a junction between a core network and an UE, and that control a radio network. What is important here is that an IP bearer is set up between a UE and a GWN.

Moreover, though the system includes just the two radio access networks 1 and 3 in the example shown in FIG. 1A, the system may include two or more radio access networks in accordance with radio communication methods supported by the mobile terminal 7. FIG. 1B shows another network configuration example of a mobile communication system in which each RNS in a radio access network 2a has a different configuration. In FIG. 1B, the RNSs in the radio access network 2a are access routers (AR) AR2A to AR2m, respectively, as shown by the symbol 3b.

Over the core network 5, user information, such as voice and packet data, is transferred between the radio access networks 1 and 3, or between either the radio access network 1 or 3 and the Internet 31, which is an external network, on the basis of a service request from a user. The core network 5 is configured by including: a mobile anchor device (GWN 33) which connects one of the radio communication networks 1 and 3 and the Internet 31 which is an external IP network; and a subscriber server (HSS) 35 which manages subscribers and locations of the respective mobile terminals 7.

The mobile terminal 7 has different radio communication means supporting the radio communication methods of the first and second radio access networks 1 and 3, respectively. The mobile terminal 7 is connected to the radio access networks 1 and 3 via communication interfaces (IFs) of these radio communication means, respectively. Note that, though configured to be connectable to the two radio access networks 1 and 3 in this embodiment, the mobile terminal 7 may have two or more radio communication means respectively supporting different radio communication methods.

Moreover, the mobile terminal 7 can be connected to the core network 5 through any of the radio access networks 1 and 3, and can further be connected to the external IP network 31 through the GWN 33 in the core network 5.

The radio access networks 1 and 3 have different connection-available areas depending on their supporting radio communication methods. Accordingly, a radio access network available for connection changes as a user moves. Hence, to continuously provide service to the user, communication is handed over between the radio access networks. In addition, different radio communication methods have different transmission qualities such as transmission rates. Accordingly, communication may be handed over to change a radio access network to be used so as to meet the user's preference, as the radio access network available for connection changes.

This embodiment employs a network configuration in which each of the radio access networks 1 and 3 is directly connected to the GWN 33. However, a hierarchical configuration may be alternatively employed in which a device controlling all the RNSs in each radio access network is provided between the radio access network and the GWN 33. Specifically, such devices may be provided respectively at a point between the GWN 33 and the RNSs 1a to 1n, and at a point between the GWN 33 and the RNSs 2a to 2m.

Figure 2A:
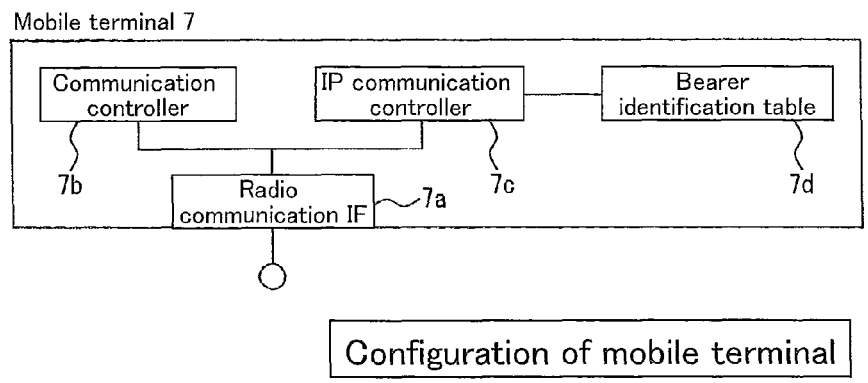
FIG. 2A is a functional block diagram showing a configuration example of a mobile terminal according to the embodiments.

Moreover, this embodiment employs a configuration in which the GWN 33 is directly connected to the external IP network 31. However, a hierarchical configuration may alternatively be employed in which a device managing multiple mobile anchor devices may be provided as a gateway to the external IP network 31. Next, a description will be given of a configuration example of the mobile terminal according to this embodiment, with reference to FIG. 2A. As shown in FIG. 2A, the mobile terminal 7 is a mobile communication terminal including: a radio communication IF 7a, a communication controller 7b, an IP communication controller 7c and a bearer identification table 7d.

The radio communication IF 7a is used for communications, through radio connection, of the mobile terminal 7 with any of the base stations 15 and 17 in the corresponding radio access network, and thus further with the RNC 11 in the radio access network and the GWN 33 in the core network 5.

The communication controller 7b controls communications, using a radio protocol, with the base station and the RNC in the radio access network via the radio communication IF 7a, and thereby enabling connection between the mobile terminal 7 and either of the radio access networks 1 and 3. The communication controller 7b also performs control of location registration of the mobile terminal 7, registration thereof to either of the mobile communication networks 1 and 3, and the like. In addition, based on information received from the communication controller 7b, the communication controller 7b determines whether or not the radio communication IFs 7a can be connected to the corresponding radio access networks.

The IP communication controller 7c transmits and receives an IP address configuration and an IP packet through a transmission path established by the communication controller 7b, as well as generates and manages the bearer identification table describing relations between IP addresses assigned by the GWN 33, and the radio communication IFs 7a. By referring to the bearer identification table, the IP communication controller 7c determines which of the IP bearers allocated to the respective radio communication IFs 7a is currently used by the mobile terminal 7 for communication.

Figure 2B:
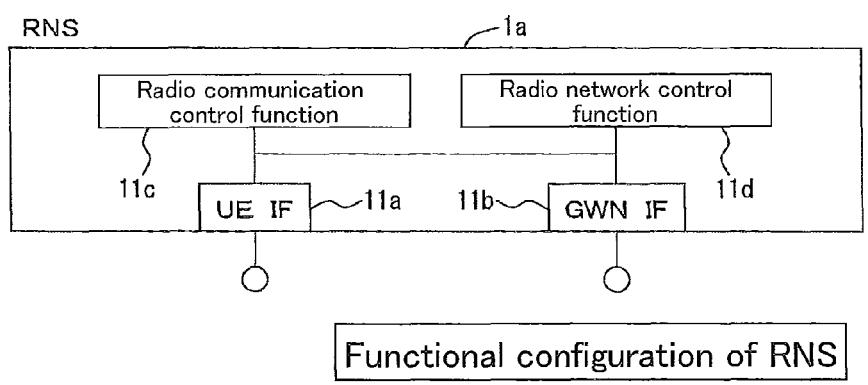
FIG. 2B is a functional block diagram showing a configuration example of an RNS according to the embodiments.

Next, a description will be given of a functional configuration of the RNS 1a (1a is used as a representative example) according to this embodiment with reference to FIG. 2B. As shown in FIG. 2B, the RNS 1a is a radio access network system including: a UE IF function 11a, a GWN IF function 11b, a radio network control function 11c and a radio communication control function 11d. FIG. 2B schematically shows functional blocks of the RNS 1a, in which each function is implemented by either or both of the RNC and each base station therein.

The UE IF function 11a is used for communications, through radio connection, between the UE 7 and the inside of the radio access network. In the UE IF function 11a, functions regarding radio connection in the physical layer are controlled by the base station 17, while radio protocol functions, such as radio resource control, radio link control and media access control, are implemented by the RNC 11 in the URTAN.

The GWN IF function 11b, used for communications with the GWN 33, functions as a communication IF that receives an RNS control message from the GWN 33, that transfers the control message to the UE 7, and that transfers communication data from the UE 7 to the GWN 33.

The radio communication control function 11c performs control in the physical layer, such as multiplexing, channel encoding, spreading and modulation, in order to allow one of the base stations to transmit and receive information to and from the UE 7 via radio waves.

The radio network control function 11d manages communication control in the radio access network, and implements radio protocol functions such as radio resource control, radio link control and media access control. In addition, the radio network control function 11d also manages radio channel allocation by controlling the base stations 15 and 17. At the same time, the radio network control function 11d provides an IF function to connect to the GWN 33, and controls communications between the RNS 1a and the GWN 33 in order to provide a bearer service between the UE 7 and the GWN 33.

Figure 2C:
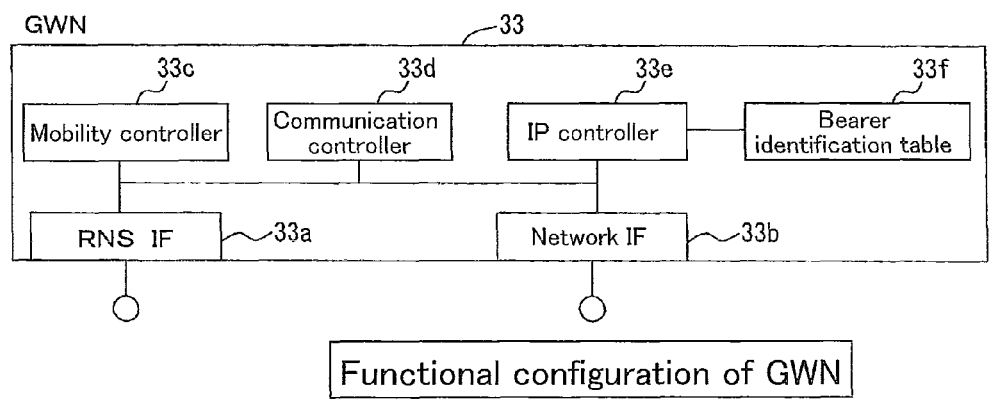
FIG. 2C is a functional block diagram showing a configuration example of a GWN according to the embodiments.

Next, a description will be given of a configuration example of the GWN according to this embodiment with reference to FIG. 2C. As shown in FIG. 2C, the GWN 33 includes: an RNS IF section 33a, a network IF 33b, a mobility controller 33c, a communication controller 33d, an IP controller 33e and a bearer identification table 33f.

The RNS IF 33a is used for communications with the RNS 1a including the RNC in the radio access network, as well as communications with the UE 7 via the RNS 1a.

The communication controller 33d performs the following operations: controlling communications, using its own protocol, with the RNC in the radio access network via the RNS IF; registering the UE 7 whose information is transmitted via the RNS; authenticating the user thereof; relocating a packet transfer route in order to select which RNS to use for communications with the UE 7; controlling a communication message from the UE 7; and controlling a communication message exchanged with the RNS.

The mobility controller 33c provides: a location management function of tracking the location of the UE 7; a paging function for paging the UE 7 when the UE 7 receives an incoming call; a function of updating the location of the UE 7; and a handover function by operating in conjunction with the communication controller.

The IP controller 33e provides: a session management function for providing a communication service; a function of setting a bearer between the GWN 33 and the UE 7; functions of routing and transferring a packet transferred in a bearer service provided through the bearer; and a function of connecting to the external IP network. In addition, the IP controller 33e also controls a handover between multiple radio communication means included by the UE 7 by using the bearer identification table describing the relations between the IP addresses assigned to the UE 7, and the radio communication IFs. Specifically, the IP controller 33e manages the bearer identification table to identify which of the IP bearers allocated to the respective radio communication IFs is currently used by the UE 7 for communication, and sets up and updates identifiers of the respective radio communication IFs in the bearer identification table to set up and update packet transfer routes between the GWN 33 and the UE 7.

The network IF 33b, which is an IF connecting the external IP network and the mobile communication system network, allows the UE 7 to communicate with the external network via the GWN 33.

Figure 2D:
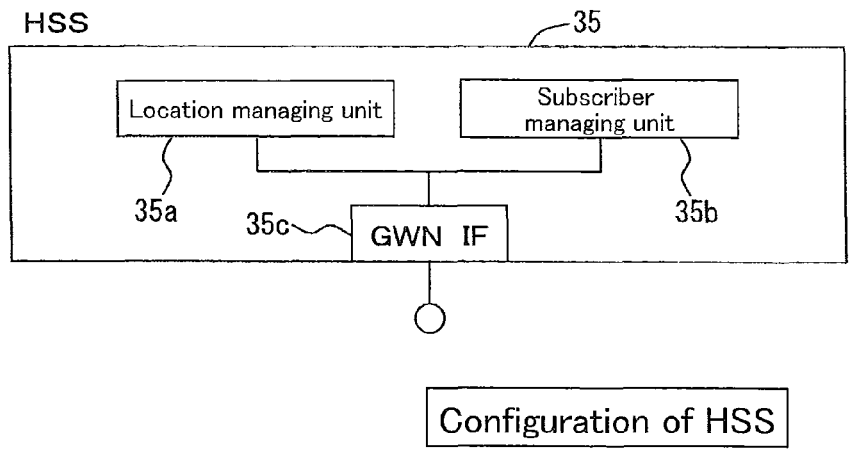
FIG. 2D is a functional block diagram showing a configuration example of an HSS according to the embodiments.

Next, a description will be given of a configuration example of the subscriber server (HSS) according to this embodiment with reference to FIG. 2D. As shown in FIG. 2D, the HSS 35 includes: a location managing unit 35a, a subscriber managing unit 35b and a GWN IF35c.

The location managing unit 35a manages location information on the UEs 7 transmitted by the respective UEs 7. Based on the location information, the HSS 35 keeps track of location areas of the users.

As user subscription information, the subscriber managing unit 35b stores therein identification information on each user, and subscription information on a mobile communication service that the user use. The user identification information includes an IMSI (International Mobile Subscriber Identity), an MSISDN (MS International PSTN/ISDN Number). The service subscriber information includes an external IP network to which the UE 7 is connected, an IP address of the UE 7, and QoS parameter values specified in the subscription contract of the user. The HSS 35 transfers the user subscription information to the GWN 35 to which the UE 7 is connected, by referring to the location information on the user managed by the location managing unit, and the GWN 35 uses the user subscription information to manage service access.

Figure 2E:
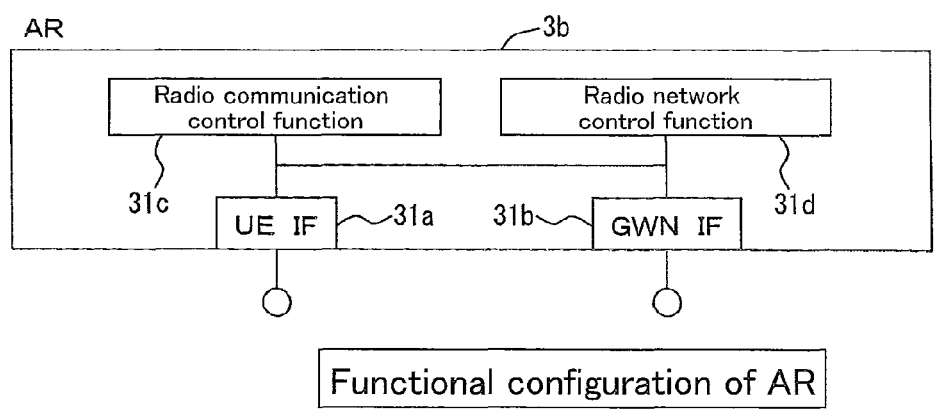
FIG. 2E is a functional block diagram showing a configuration example of an AR according to the embodiments.

Next, a description will be given of a functional configuration of the access router (AR) according to this embodiment with reference to FIG. 2E. As shown in FIG. 2E, the AR 3b is a radio access network system including: a UE IF function 31a, a GWN IF function 31b, a radio network control function 31d and a radio communication control function 31c. The UE IF function 31a is used for communications, through radio connection, between the UE 7 and the inside of the radio access network. The GWN IF function 31b, used for communications with the GWN 33, functions as a communication IF that transfers, to the GWN 33, a control message on a path to the GWN 33, and communication data from the UE 7.

The radio communication control function 31c performs control on radio connection in the physical layer, such as multiplexing, channel encoding, spreading and modulation, in order to allow the AR to transmit and receive information to and from the UE 7 via radio waves.

The radio network control function 31d manages communication control in the radio access network, and implements radio protocol functions such as radio resource control, radio link control and media access control. At the same time, the radio network control function 31d provides an IF function to connect to the GWN 33, and controls communications between the AR and the GWN 33 in order to provide a bearer service between the UE 7 and the GWN 33.

Note that a system configuration of a mobile communication network is not limited to what has been described above, since, depending on specifications of a mobile communication system, a different system configuration may be employed in the mobile communication network to implement the foregoing functions.

Figure 3A:
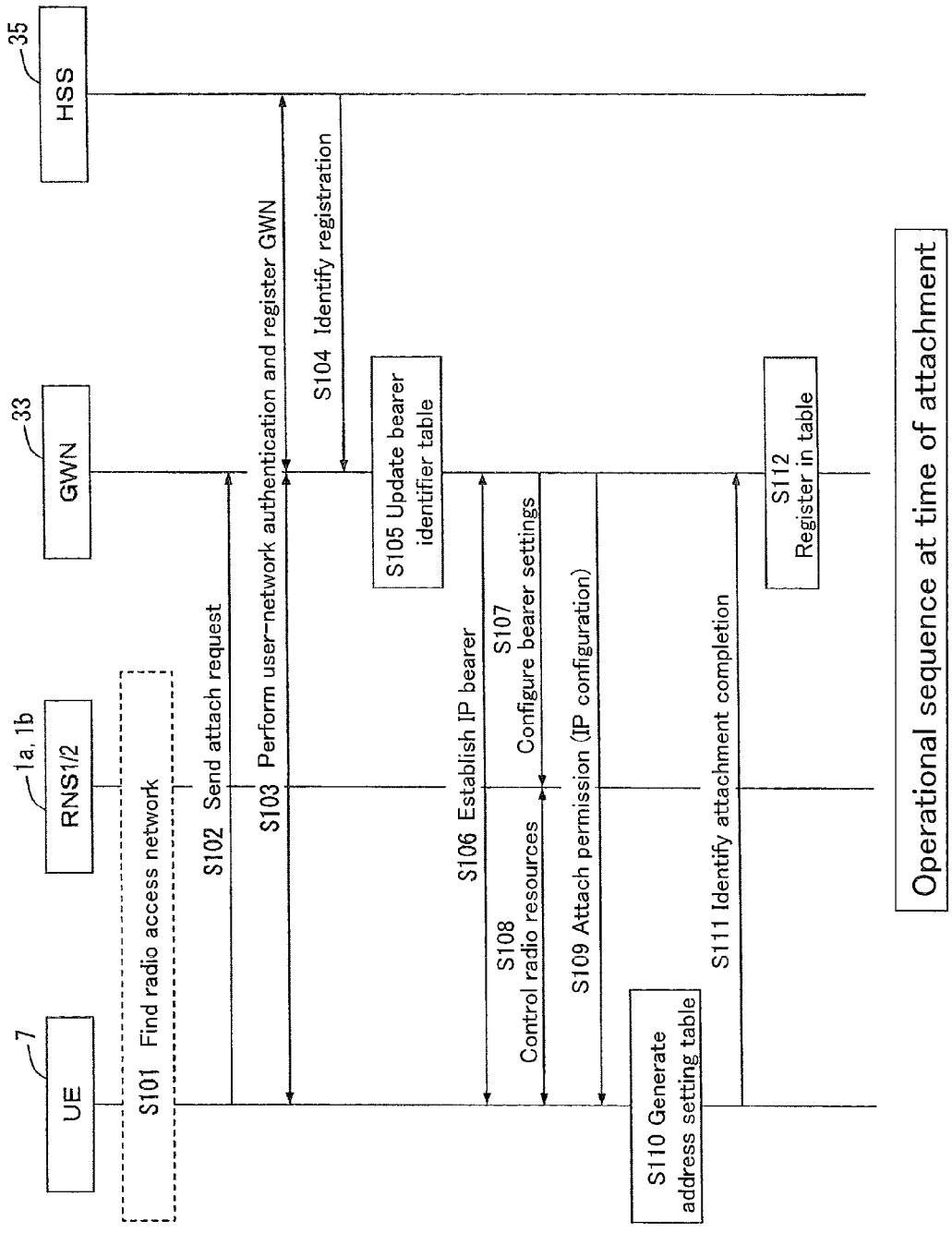
FIG. 3A is an operational sequence diagram at the time of attachment in the mobile communication system according to one of the embodiments.
Figure 3B:
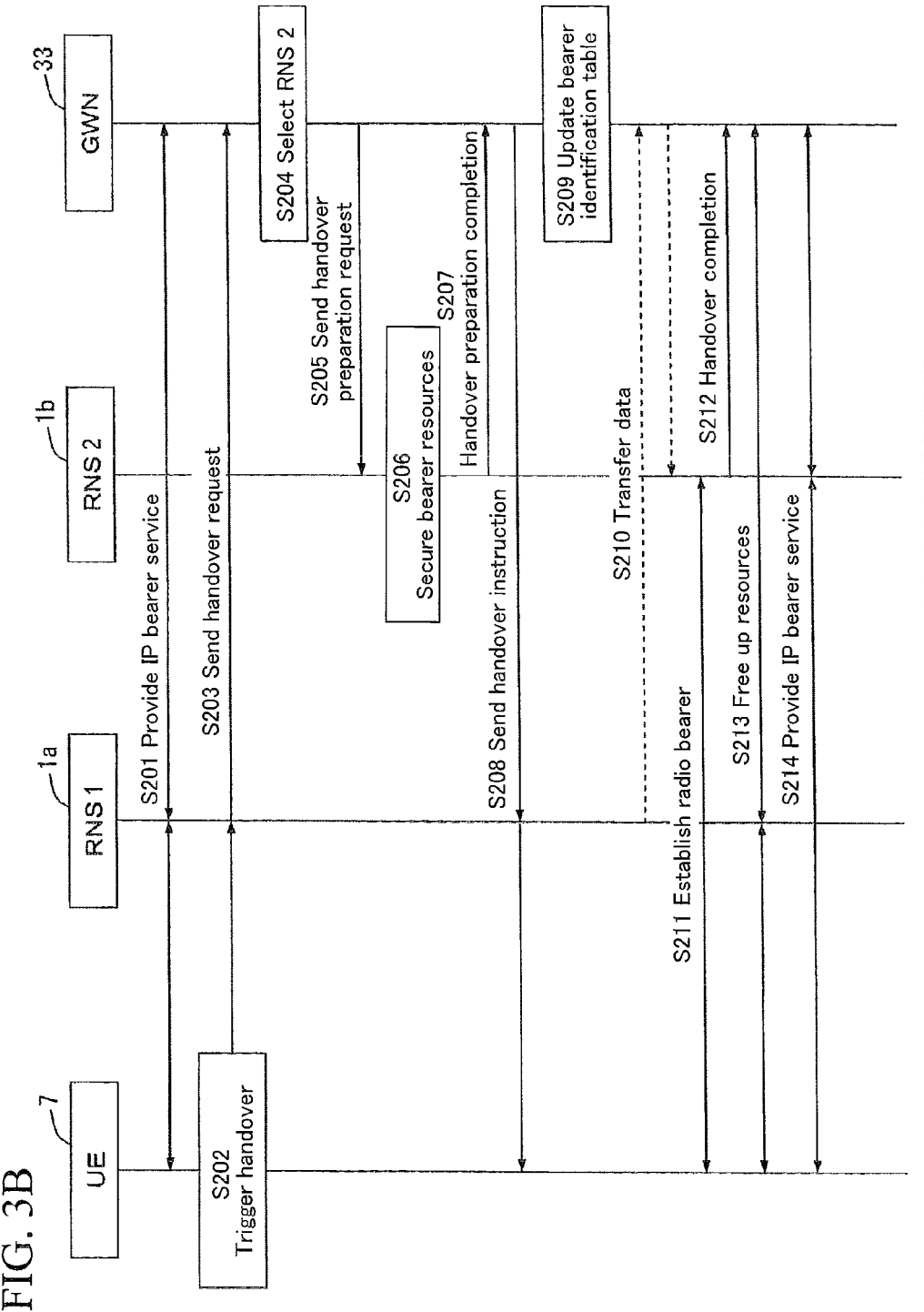
FIG. 3B is a first operational sequence diagram at the time of a handover in the mobile communication system according to one of the embodiments.
Figure 3C:
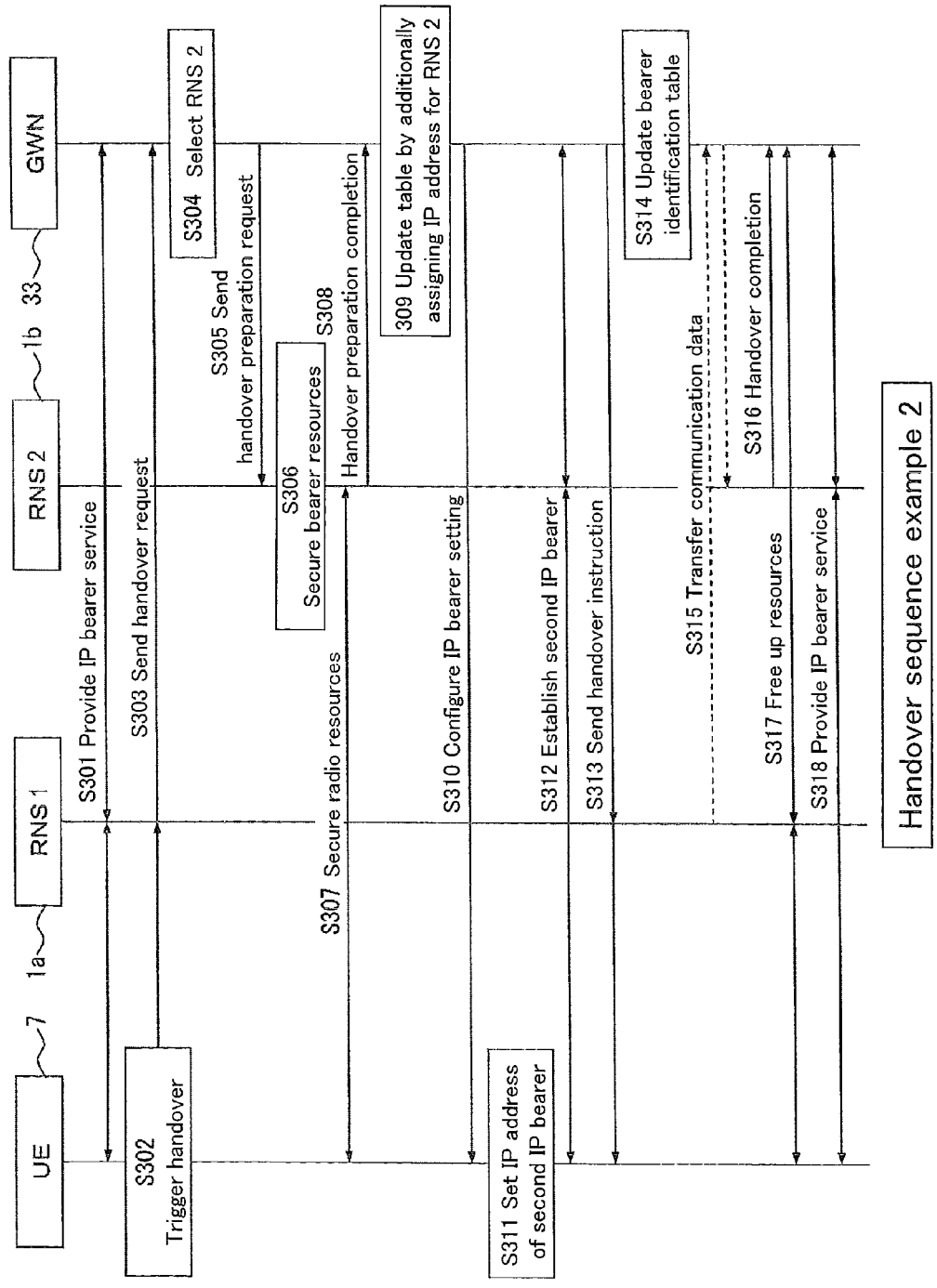
FIG. 3C is a second operational sequence diagram at the time of a handover in the mobile communication system according to one of the embodiments.
Figure 3D:
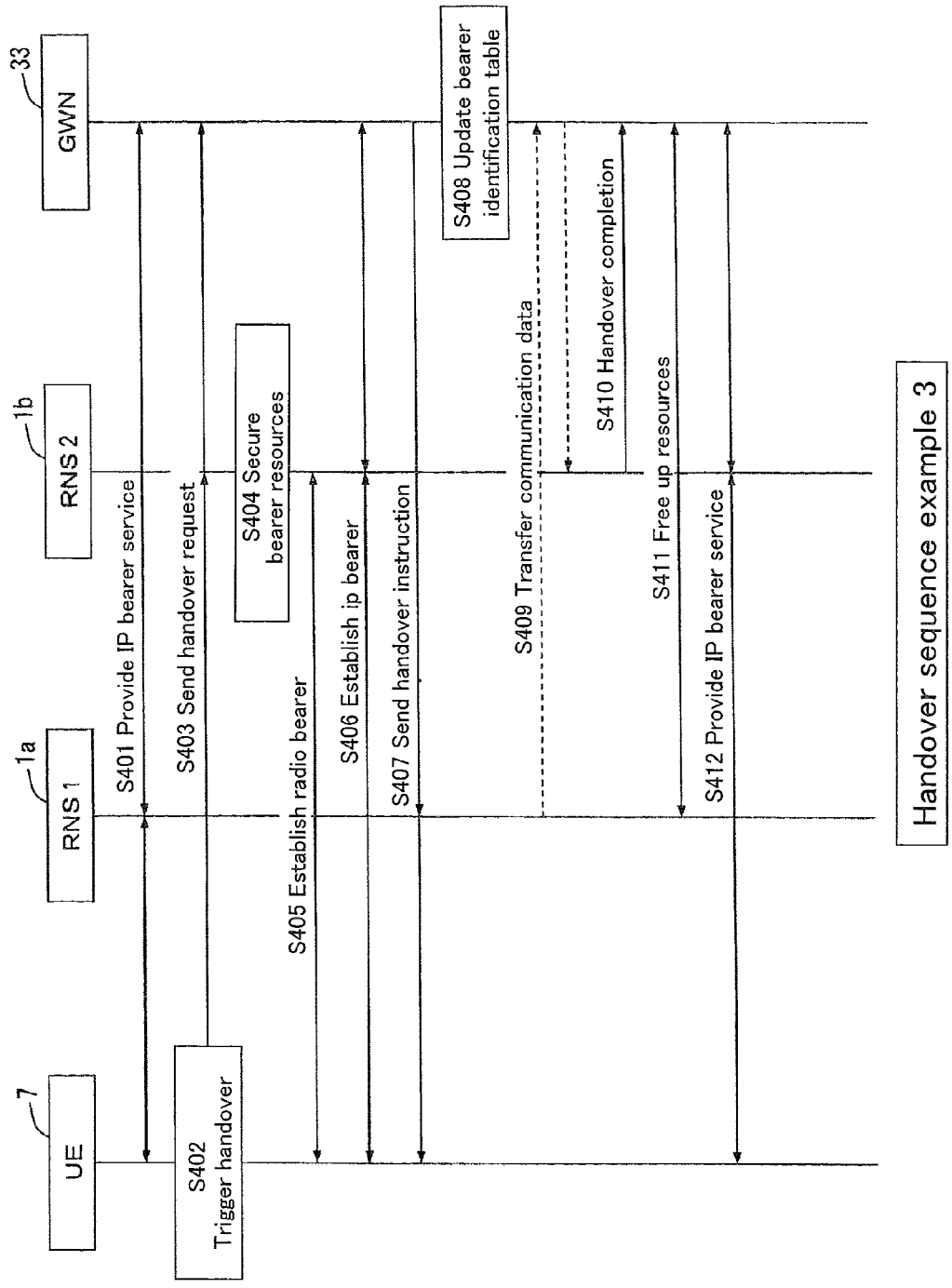
FIG. 3D is a third operational sequence diagram at the time of a handover in the mobile communication system according to one of the embodiments.
Figure 3E:
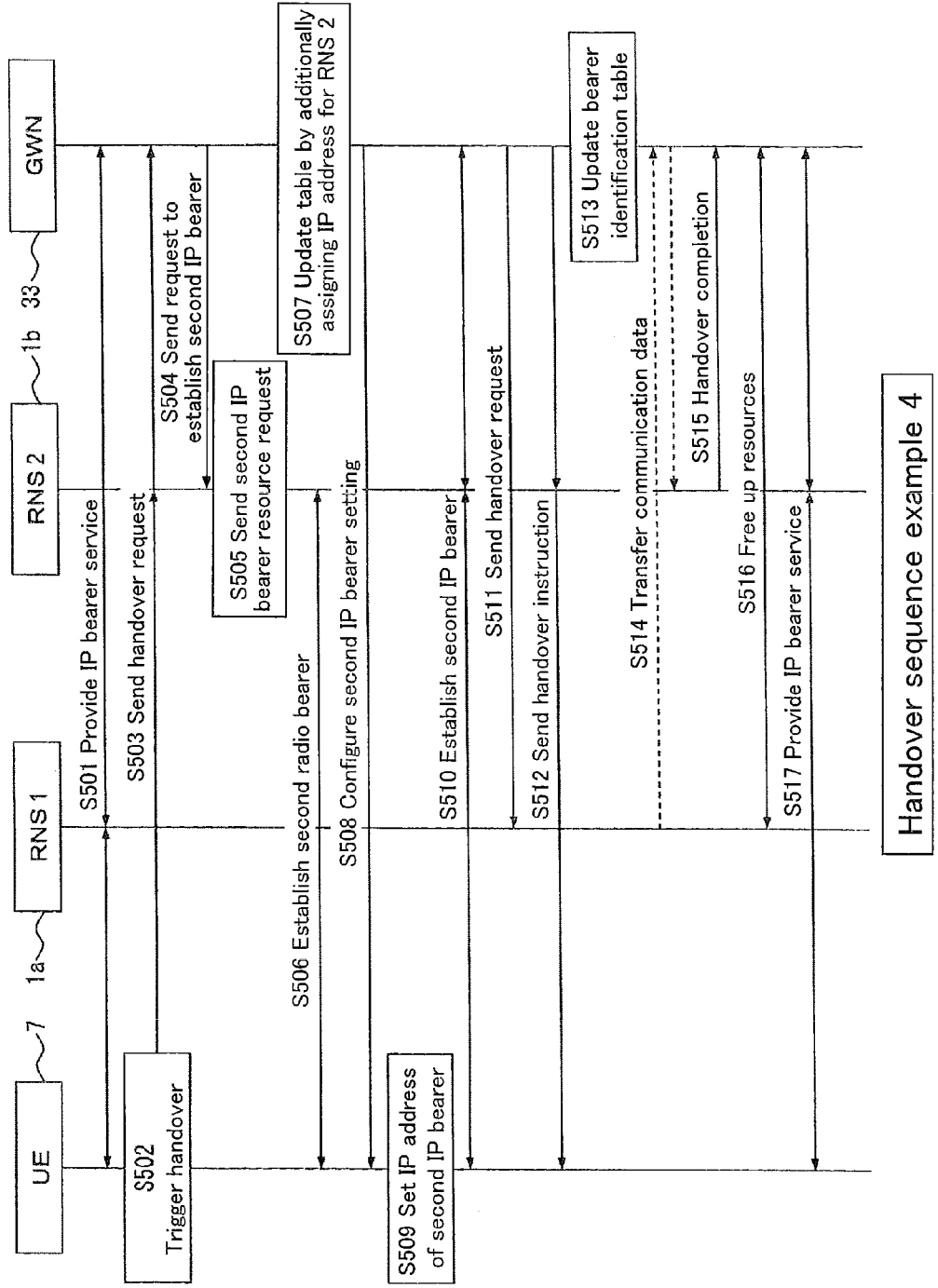
FIG. 3E is a fourth operational sequence diagram at the time of a handover in the mobile communication system according to one of the embodiments.
Figure 5A:
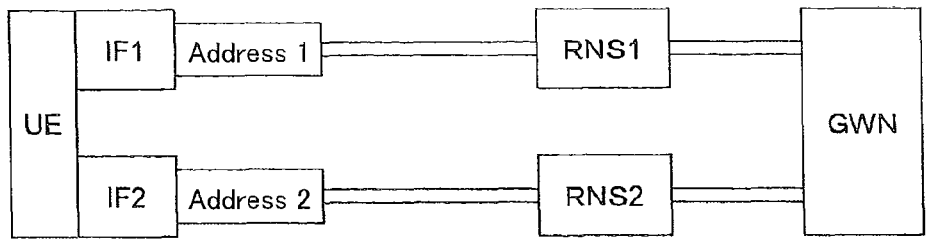
FIG. 5A shows an example of IP bearer settings at the time of attachment.
Figure 5B:
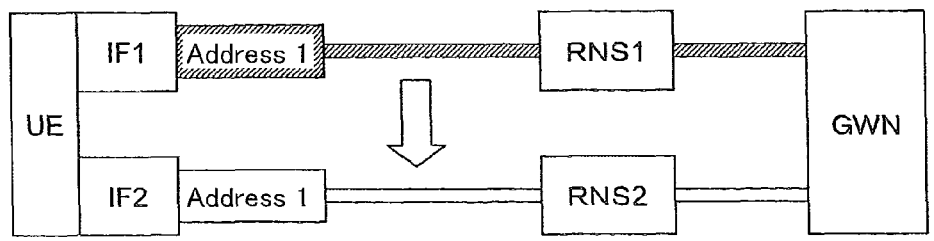
FIG. 5B shows an example of how to change the IP bearer settings in the first and third handover sequence examples.
Figure 5C:
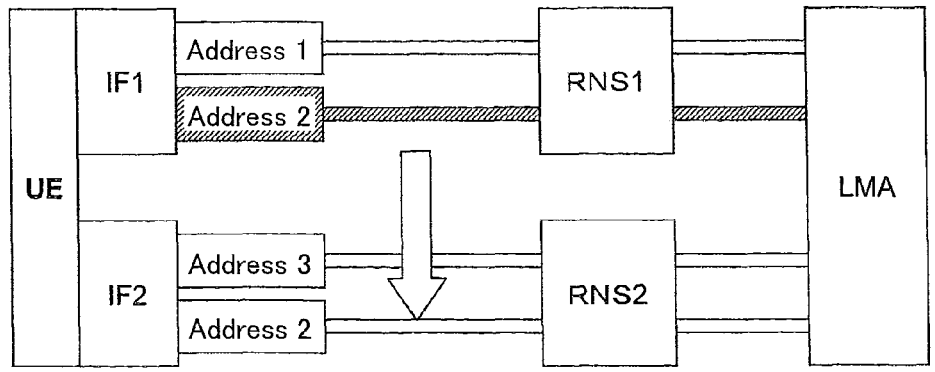
FIG. 5C shows an example of how to change the IP bearer settings in the second and fourth handover sequence examples.

FIG. 3A is a sequence diagram illustrating operations performed by the constituent devices when the UE 7 attaches to (register itself in) the mobile communication system. FIGS. 3B and 3C each are a sequence diagram illustrating operations performed by the constituent devices when a handover trigger is generated via the RNS 1 at the time of a handover from the RNS 1a to the RNS 2a, for example. FIGS. 3D and 3E each are a sequence diagram illustrating operations performed by the devices when a handover trigger is generated via the RNS 2. FIGS. 5A to 5C are examples of IP bearer settings between the UE and the GWN which are set based on these operational sequences, respectively.

ATTACH EXAMPLE 1

Firstly, a description will be given of the operational sequence performed when the UE 7 attaches to the mobile communication system. The UE 7 includes communication means that enable connection to an RNS (1)1 and to an RNS (2)3, respectively. Note that, since the operational sequence performed when the UE 7 attaches simultaneously to both the RNSs (1)1 and (2)3 is the same as that performed when the UE 7 sequentially attaches to the RNSs (1)1 and (2)3, the operational sequences respectively for the RNSs (1)1 and (2)3 can be illustrated using a single operational sequence diagram regardless of the attaching order, namely, whether the UE 7 attaches simultaneously to both the RNSs or attaches firstly to either of the RNSs. Accordingly, as shown in FIG. 3A, a single operational sequence diagram is used for illustrating operational sequences respectively for an RNS (1)1a and an RNS (2)1b.

In this embodiment, employed is the case where the UE 7 operates in the two different radio access networks 1 and 3 by using the RNSs (1)1a and (2)1b, as an example. However, even when the UE 7 is attachable to two or more different radio access networks, handovers among the radio access networks can be implemented in a similar procedure.

Firstly, upon turned on, the UE 7 searches for networks currently available for connection through the respective radio communication IFs (part of S101). In this embodiment, both the radio access networks 5 of the respective RNSs (1)1a and (2)1b are available for connection. Upon finding the available radio access networks 5 (part of S101), via the corresponding RNSs, the UE 7 sends the GWN 33 attach requests each including information elements such as a UE identifier (UE-ID) and an attach type (S102).

Then, the GWN 33 registers the UE 7 onto the HSS 35, performs mutual authentication between the user and each network, and registers the GWN 33 onto the HSS 35 (S103). Upon identifying the registration of the GWN 33, the HSS 35 transfers, to the GWN 33, subscriber information for a default IP bearer including authenticated service subscription information and billing information (S104). Then, based on information including this subscriber information and user preferences received from the UE 7, the GWN 33 determines an IP address to be assigned to the UE 7, and updates the corresponding portion of the bearer identifier table at the same time (S105).

Furthermore, based on the thus-assigned IP address, the GWN 33 establishes an IP bearer over which user data is to be transferred, and adds a default policy, a billing rule and the like to the IP bearer (S106). In this embodiment, the GWN 33 starts to establish the IP bearer, which may be started by either of the UE 7 and the GWN 33, though.

Once the default IP bearer is established, the GWN 33 provides the RNS 1/2 (1a or 1b) with QoS (Quality of Service) information such as the maximum transfer rate allowed for the default IP bearer (S107). Based on the information, the RNS 1a or 1b controls radio resources therein (S108).

At the same time, the GWN 33 transmits, to the UE 7, a message that the UE 7 is permitted to attach to the mobile access network, as well as information including the assigned IP address and a tentative identifier for identifying the UE 7 such as a TMSI (Temporary Mobile Subscriber Identity) or a P-TMSI (Packet Temporary Mobile Subscriber Identity) (S109). The UE 7 sets the assigned IP address in itself, and generates an address setting table consisting of an UE identifier (UE-ID) and interface identifiers (IF-IDs) of the supported radio communication IFs (S110).

As the UE-ID, used is an identifier that allows unique identification of the UE 7, such as an IMSI, an MSISDN, or an IMEI (International Mobile Station Equipment Identity) assigned to a mobile terminal device. Meanwhile, as the IF-ID, which needs to be an identifier identifying a radio communication IF from another, used in this embodiment is an subscriber identifier tentatively assigned in the mobile communication network, such as TMSI or P-TMSI. As the IF-ID, an identifier that identifies a radio communication IF is used herein, but an identifier that identifies a radio access network to which a radio communication IF is connected may alternatively be used. Still alternatively, in the case where different radio access networks are operated by different providers, an identifier that identifies a provider from another, such as a public mobile communication network identifier (PLMN-ID), may be used. More specifically, the radio access network identifier may also be related to identifiers used in communications between the UE 7 and one of the base stations, communications between the base station and the RNC, and communications between the RNC and the GWN.

The UE 7 sends the GWN 33 a network attachment completion message including the thus-generated bearer identifier table (S111). In response, the GWN 33 registers bearer identifier information included in the received message as the bearer identifier table (S112). FIGS. 4A and 5A show an example of the bearer identifier table and the address setting table, and an example of IP bearer settings, respectively, where IF-ID1, IF-ID2, IP address 1 and IP address 2 denote the IF-IDs that allow connection to the RNSs (1)1a and (2)1b, and the IP addresses assigned therein, respectively.

HANDOVER EXAMPLE 1

Next, with reference to FIGS. 3B and 5B, a description will be given of an example of the operational sequence performed at the time of a handover from the RNS (1)1a to the RNS (2)1b triggered by a handover request message that the UE 7 sends via the RNS (1)1a during data communication via the RNS (1)1a. In the example, only a single bearer, namely only a default bearer, is used in each of the radio access network (1)1*a* including the RNS (1)1*a* and the radio access network 2 including the RNS (2)1*b*.

Initially, the IP bearer via the RNS (1)1*a* is established between the UE 7 and the GWN 33, and the UE 7 uses communication services over the IP bearer (S201). Assume here that the user or the UE 7 autonomously determines to make a handover from the radio access network of the RNS (1)1*a* to the radio access network of the RNS (2)1*b* since factors such as changes in a radio environment accompanying the user's movement either make the radio access network of the RNS (2)1*b* available for connection, or cause deterioration in radio quality of the RNS (1)1*a* (S202). Then, via the RNS (1)1*a*, the UE 7 sends the GWN 33 a handover request including: its UE-ID, and the IF-ID of a radio communication means that allows connection to the handover destination radio access network (S203). In response, the GWN 33 selects the RNS (2)1*b* to be used in the handover destination radio access network 3 (S204) by referring to the received handover request message, and sends the RNS (2)1*b* a handover preparation request message (S205). The handover request sent by the UE 7 (S203) includes information specifying the RNS (2)1*b* as a handover destination, such as an interface identifier of the radio communication IF corresponding to the RNS (2)1*b*, a radio access network identifier of the RNS (2)1*b*, or information directly identifying the RNS (2)1*b*.

Here, in this embodiment, the user or the UE 7 autonomously determines to make a handover (S202). Alternatively, however, based on information given by the UE 7 on changes in radio conditions surrounding the environment of the UE 7, the RNS 1 may determine to make a handover, and may send the GWN 33 a handover request (S203).

The RNS (2)1*b*, specified as a handover destination, secures bearer resources including radio resources in the radio access network (2)3 allocated to the UE 7(S206). Upon completing handover preparation, the RNS (2)1*b* sends the GWN 33 a handover preparation completion message (S207).

Upon receiving the handover preparation completion message, the GWN 33 sends a handover instruction to the RNS (1)1*a*, and to the UE 7 via the RNS (1)1*a* (S208). After sending the handover instruction, the GWN 33 updates: the IP address entry for the IF-ID2 in the bearer identification table (from IP address 2 to IP address 1); packet transfer routing information between the UE 7 and the GWN 33; and information on the IP bearer established in the radio access network (S209). FIGS. 4B and 5B show an example of how to update information on the IP bearer used in the RNS (2)1*b*, and an example of how to change the IP bearer settings, respectively.

Meanwhile, upon receiving the handover instruction, the RNS (1)1*a* starts transferring, to the RNS (2)1*b* via the GWN 33, communication data addressed to the UE 7 (S210). Depending on the settings on the RNS (1)1*a*, the RNS (1)1*a* may also transfer the communication data from itself to the UE 7 at the same time in order to avoid data loss. Alternatively, the RNS (1)1*a* may transfer the communication data to the RNS (2)1*b* directly, i.e. not via the GWN 33. Moreover, the handover instruction may include either an interface identifier of the radio communication IF corresponding to the RNS 2, or a radio access network identifier of the RNS 2.

Upon establishment of a radio bearer between the RNS (2)1*b* and the UE 7 (S211), the RNS (2)1*b* sends the GWN 33 a handover completion message indicating completion of the handover processing (S212). Following this handover completion, the GWN 33 frees up the resources in the handover source radio access network (S213). As a result, the IP bearer via the RNS (2)1*b* is established, which makes it possible to provide data communication services using this IP bearer (S214). In addition, at the time of establishing the IP bearer, the UE updates the address setting table in a similar manner to updating the bearer identification table. The bearer identification table and the address setting table may be updated at any timings as long as the updating does not interfere with the handover.

The description has been given of the operational sequence performed at the time of the handover from the RNS (1)1*a* to the RNS (2)1*b* in this embodiment. However, the handover processing for any handover, such as that from the RNS (2)1*b* to the RNS (1)1*a*, or that to another radio access network, may be implemented using a similar operational sequence. Moreover, the handover processing may be implemented using the operational sequence irrespectively of types of the handover source radio access network and the handover destination radio access network.

In addition, as long as the handover destination radio access system uses a single IP bearer, the handover processing may be implemented using a similar operational sequence even if the handover source uses multiple IP bearers.

HANDOVER EXAMPLE 2

Next, with reference to FIGS. 3C and 5C, a description will be given of another example of the operational sequence performed at the time of handover from the RNS (1)1*a* to the RNS (2)1*b* triggered by a handover request message that the UE 7 sends via the RNS (1)1*a* during data communication via the RNS (1)1*a*. In this embodiment, two IP bearers, namely a default bearer and a second bearer, are used in each of the radio access network (1)1 and the radio access network (2)3. Note that, though being two in this embodiment, the number of IP bearers used in each radio access network may be two or more.

The steps from S301 to S306 will not be described in detail since they are approximately the same as the equivalent steps in the operational sequence using only a default bearer in each radio access network. Note however that the handover request sent by the UE 7 in this embodiment (S303) further includes information identifying a handover destination bearer (an IP address identifying a handover destination IP bearer, in this embodiment), in addition to the information specifying the RNS (2)1*b* as a handover destination, such as an interface identifier of the radio communication IF corresponding to the RNS (2)1*b*, a radio access network identifier of the RNS (2)1*b*, or information directly identifying the RNS (2)1*b*. Moreover, in this embodiment, the user or the UE 7 autonomously determines to make a handover (S302). Alternatively, however, based on information given by the UE 7 on changes in radio conditions surrounding the environment of the UE 7, the RNS (1)1*a* may determine to make a handover, and may send the GWN 33 a handover request (S303).

After the RNS (2)1*b* secures bearer resources in the radio access network (2)3 (S306), a radio bearer is established between the RAN (2)1*b* and the UE 7 (S307). In response, the RNS (2)1*b* sends the GWN 33 a handover preparation completion message (S308).

Upon receiving the handover preparation completion message, the GWN 33 assigns an IP address to the second bearer newly established via the RNS (2)1*b*, and updates the information in the bearer identification table at the same time (S309). In addition, based on this newly assigned IP address, the GWN 33 configures IP settings on the second IP bearer (S310 and S311).

Upon confirming that the second IP bearer via the RNS (2)1b is established (S312), the GWN 33 sends a handover instruction to the RNS (1)1a, and to the UE 7 via the RNS (1)1a (S313). After sending the handover instruction, the GWN 33 updates: the IP address entry for the IF-ID2 corresponding to the second IP bearer in the bearer identification table (from IP address 4 to IP address 2); packet transfer routing information between the UE 7 and the GWN 33; and information on the IP bearer established in the radio access network (S314). FIGS. 4C and 5C each show an example of how to update information on the second IP bearer newly established in the RNS (2)1b.

Here, in the RNS (2)1b, the initial IP address of the second IP bearer, which is set to a different IP address (address 4) from that of the default IP bearer in this embodiment, may alternatively be set to the same IP address (address 3) as that of the default IP bearer.

The description has been given of the procedure in which the IP address of the handover destination second IP bearer is firstly set to the initial IP address (address 4), and then updated to the IP address (address 2) of the handover source IP bearer, in this embodiment. However, the handover destination IP address (address 2) may be set to the handover source IP address (address 2) from the outset.

Meanwhile, upon receiving the handover instruction, the RNS (1)1a starts transferring, to the RNS (2)1b via the GWN 33, communication data addressed to the UE 7 (S315). Depending on the settings on the RNS (1)1a, the RAN (1)1a may also transfer the communication data from itself to the UE 7 at the same time in order to avoid data loss. Alternatively, the RNS (1)1a may transfer the communication data to the RNS (2)1b directly, i.e. not via the GWN 33. Moreover, the handover instruction may include: either an interface identifier of the radio communication IF corresponding to the RNS 2, or a radio access network identifier of the RNS 2; and information identifying a handover destination bearer (an IP address identifying a handover destination IP bearer, in this embodiment).

Upon start of data transfer, the RNS (2)1b sends the GWN 33 a handover completion message indicating completion of the handover processing (S316). Following the handover completion, the GWN 33 frees up the resources in the handover source radio access network (S317). As a result, the IP bearer via the RNS (2)1b is established, which makes it possible to provide data communication services using this IP bearer (S318). In addition, at the time of establishing the IP bearer, the UE updates the address setting table in a similar manner to updating the bearer identification table. The bearer identification table and the address setting table may be updated at any timings as long as the updating does not interfere with the handover.

Hereinabove, the description has been given of the operational sequence performed at the time of the handover from the RNS (1)1a to the RNS (2)1b in this embodiment. However, the handover processing for any handover, such as that from the RNS (2)1b to the RNS (1)1a, or that to another radio access network, may be implemented using a similar operational sequence. Moreover, the handover processing may be implemented using the operational sequence irrespectively of types of the handover source radio access network and the handover destination radio access network.

In addition, as long as the handover destination radio access system uses multiple IP bearers, the handover processing may be implemented using a similar operational sequence even if the handover source uses a single IP bearer.

HANDOVER EXAMPLE 3

Next, with reference to FIG. 3D, a description will be given of an example of the operational sequence performed at the time of handover from the RNS (1)1a to the RNS (2)1b triggered by a handover request message that the UE 7 sends via the RNS (2)1b during data communication via the RNS (1)1a. In the example, only a single bearer, namely only a default bearer, is used in each of the radio access network (1)1 including the RNS (1)1a and the radio access network 2(3) including the RNS (2)1b.

Initially, the IP bearer via the RNS (1)1a is established between the UE 7 and the GWN 33, and the UE 7 uses communication services over the IP bearer (S401). Assume here that the user or the UE 7 autonomously determines to make a handover from the radio access network of the RNS (1)1a to the radio access network of the RNS (2)1b since factors such as changes in a radio environment accompanying the user's movement either make the radio access network of the RNS (2)1b available for connection, or cause deterioration in radio quality of the RNS (1)1a (S402).

Here, in this embodiment, the user or the UE 7 autonomously determines to make a handover (S402). Alternatively, however, based on information given by the UE 7 on changes in radio conditions surrounding the environment of the UE 7, the RNS (1)1b may determine to make a handover, and may send the GWN 33 a handover request (S403). Then, via the RNS (2)1b, the UE 7 sends the GWN 33 a handover request including: its UE-ID, and the IF-ID of a radio communication means that allows connection to the handover destination radio access network (S403). The RNS (2)1b secures bearer resources including radio resources in the radio access network (2)3 allocated to the UE 7 (S404), by referring to the received handover request message. As a result, a radio bearer between the RNS (2)1b and the UE 7 (S405) is established, and the IP bearer via the RNS (2)1b is established between the UE 7 and the GWN 33 (S406). In response, the GWN 33 sends a handover instruction to the RNS (1)1a, and to the UE 7 via the RNS (1)1a (S407). After sending the handover instruction, the GWN 33 updates: the IP address entry for the IF-ID2 in the bearer identification table (from IP address 2 to IP address 1); packet transfer routing information between the UE 7 and the GWN 33; and information on the IP bearer established in the radio access network (S408). FIGS. 4B and 5B each show an example of how to update information on the IP bearer used in the RNS (2)1b.

Meanwhile, upon receiving the handover instruction, the RNS (1)1a starts transferring, to the RNS (2)1b via the GWN 33, communication data addressed to the UE 7 (S409). Depending on the settings on the RNS (1)1a, the RAN (1)1a may also transfer the communication data from itself to the UE 7 at the same time in order to avoid data loss. Alternatively, the RNS (1)1a may transfer the communication data to the RNS (2)1b directly, i.e. not via the GWN 33. Moreover, the handover instruction may include either an interface identifier of the radio communication IF corresponding to the RNS (2)1b, or a radio access network identifier of the RNS (2)1b.

Upon start of transferring communication data to the RNS (2)1b, the RNS (2)1b sends the GWN 33 a handover completion message indicating completion of the handover processing (S410). Following this handover completion, the GWN 33 frees up the resources in the handover source radio access network (S411). As a result, the IP bearer via the RNS (2)1b is established, which makes it possible to provide data communication services using this IP bearer (S412).

In addition, at the time of establishing the IP bearer, the UE updates the address setting table in a similar manner to updating the bearer identification table. The bearer identification table and the address setting table may be updated at any timings as long as the updating does not interfere with the handover.

The description has been given of the operational sequence performed at the time of the handover from the RNS (1)1a to the RNS (2)1b in this embodiment. However, the handover processing for any handover, such as that from the RNS (2)1b to the RNS (1)1a, or that to another radio access network, may be implemented using a similar operational sequence. Moreover, the handover processing may be implemented using the operational sequence irrespectively of types of the handover source radio access network and the handover destination radio access network.

In addition, as long as the handover destination radio access system uses a single IP bearer, the handover processing may be implemented using a similar operational sequence even if the handover source uses multiple IP bearers.

HANDOVER EXAMPLE 4

Next, with reference to FIG. 3E, a description will be given of another example of the operational sequence performed at the time of handover from the RNS (1)1a to the RNS (2)1b triggered by a handover request message that the UE 7 sends via the RNS (2)1b during data communication via the RNS (1)1a. In this embodiment, two IP bearers, namely a default bearer and a second bearer, are used in each of the radio access network (1)1 and the radio access network (2)3. Note that, though being two in this embodiment, the number of IP bearers used in each radio access network may be two or more.

The steps from S501 to S503 are approximately the same as the equivalent steps in the operational sequence using only a default bearer in each radio access network. Note however that the handover request sent by the UE 7 in this embodiment (S503) further includes information identifying a handover destination bearer (an IP address identifying a handover destination IP bearer, in this embodiment), in addition to the information specifying the RNS (1)1a as a handover source, such as an interface identifier of the radio communication IF corresponding to the RNS (2)1b, or a radio access network identifier of the RNS (2)1b.

Moreover, in this embodiment, the user or the UE 7 autonomously determines to make a handover (S502). Alternatively, however, based on information given by the UE 7 on changes in radio conditions surrounding the environment of the UE 7, the RNS (1)1a may determine to make a handover, and may send the GWN 33 a handover request (S503). Upon receiving the handover request, the GWN 33 sends the RNS (2)1b a bearer request message to secure resources for the second IP bearer (S504). Upon receiving the bearer request message, the RNS (2)1b secures bearer resources required by the second IP bearer in the RNS (2)1b (S505), and establishes a radio bearer between the UE 7 and the RNS (2)1b (S506).

The GWN 33 assigns an IP address to the second bearer newly established via the RNS (2)1b, and updates the information in the bearer identification table at the same time (S507). In addition, based on this newly assigned IP address, the GWN 33 configures IP settings on the second IP bearer (S508 and S509).

Upon confirming that the second IP bearer via the RNS (2)1b is established (S510), the GWN 33 sends the RNS (1)1a the handover request (S511), and sends a handover instruction to the RNS (2)1b, and to the UE 7 via the RNS (2)1b (S512). After that, the GWN 33 updates: the IP address entry for the IF-ID2 corresponding to the second IP bearer in the bearer identification table (from IP address 4 to IP address 2);

packet transfer routing information between the UE 7 and the GWN 33; and information on the IP bearer established in the radio access network (S513). FIGS. 4C and 5C each show an example of how to update information on the second IP bearer newly established in the RNS (2)1b.

Here, in the RNS (2)1b, the initial IP address of the second IP bearer, which is set to a different IP address (address 4) from that of the default IP bearer in this embodiment, may alternatively be set to the same IP address (address 3) as that of the default IP bearer.

Moreover, this embodiment employs the procedure in which the IP address of the handover destination second IP bearer is firstly set to the initial IP address (address 4), and then updated to the IP address (address 2) of the handover source IP bearer. However, the handover destination IP address (address 2) may be set to the handover source IP address (address 2) from the outset.

Meanwhile, upon receiving the handover request, the RNS (1)1a starts transferring, to the RNS (2) via the GWN 33, communication data addressed to the UE 7 (S514). Depending on the settings on the RNS (1)1a, the RAN (1)1a may also transfer the communication data from itself to the UE 7 at the same time in order to avoid data loss. Alternatively, the RNS (1)1a may transfer the communication data to the RNS (2)1b directly, i.e. not via the GWN 33. Moreover, the handover instruction may include: either an interface identifier of the radio communication IF corresponding to the RNS 2, or a radio access network identifier of the RNS 2; and information identifying a handover destination bearer (an IP address identifying a handover destination IP bearer, in this embodiment).

Upon start of data transfer, the RNS (2)1b sends the GWN 33 a handover completion message indicating completion of the handover processing (S515). Following the handover completion, the GWN 33 frees up the resources in the handover source radio access network (S516). As a result, the IP bearer via the RNS (2)1b is established, which makes it possible to provide data communication services using this IP bearer (S517). In addition, at the time of establishing the IP bearer, the UE updates the address setting table in a similar manner to updating the bearer identification table. The bearer identification table and the address setting table may be updated at any timings as long as the updating does not interfere with the handover.

The description has been given of the operational sequence performed at the time of the handover from the RNS (1)1a to the RNS (2)1b in this embodiment. However, the handover processing for any handover, such as that from the RNS (2)1a to the RNS (1)1b, or that to another radio access network, may be implemented using a similar operational sequence. Moreover, the handover processing may be implemented using the operational sequence irrespectively of types of the handover source radio access network and the handover destination radio access network.

In addition, as long as the handover destination radio access system uses multiple IP bearers, the handover processing may be implemented using a similar operational sequence even if the handover source uses a single IP bearer.

ATTACH EXAMPLE 2

Next, with reference to FIG. 3A, a description will be given of an example where a bearer context is used as a identifier that identifies an IP bearer.

Firstly, by use of FIG. 3A, a description will be given of the operational sequence performed when the UE 7 attaches to the mobile communication system. The steps from S101 to S104 are approximately the same as the equivalent steps in the foregoing operational sequence performed for attaching. Based on information including the above subscriber information and the user preferences received from the UE 7, the GWN 33 determines an IP address to be assigned to the UE 7 and a bearer context including a bearer identifier that identifies an IP bearer, and updates the corresponding portion of the bearer identifier table at the same time (S105). In the UMTS, a PDP address, a tunnel endpoint identifier and a PDP context are used as the IP address to be assigned to the UE 7, the bearer identifier and the bearer context, respectively.

Furthermore, based on the thus-assigned IP address and the bearer context, the GWN 33 establishes an IP bearer over which user data is to be transferred, and adds a default policy, a billing rule and the like to the IP bearer (S106). Once the default IP bearer is established, the GWN 33 provides the RNS 1/2 (1*a* or 1*b*) with QoS (Quality of Service) information such as the maximum transfer rate allowed for the default IP bearer (S107). Based on the information, the RNS 1*a* or 1*b* controls radio resources therein (S108).

At the same time, the GWN 33 transmits, to the UE 7, a message that the UE 7 is permitted to attach to the mobile access network (S109). The attachment permission message includes: the IP address to be assigned to the UE 7; the bearer context including at least an identifier that identifies a bearer; and an identifier for identifying a radio communication means or a radio access system. The UE 7 sets the assigned IP address in itself, and generates an address setting table consisting of an UE identifier and the bearer contexts and the radio access network identifiers (S110).

In this embodiment, as the UE-ID, used is an identifier that allows unique identification of the UE 7, such as an IMSI, an MSISDN, or an IMEI (International Mobile Station Equipment Identity) assigned to a mobile terminal device. Meanwhile, as the IF-ID, used is an subscriber identifier tentatively assigned in the mobile communication network, such as TMSI or P-TMSI. In the case where each radio access network has an RAN-ID that identifies itself, the RAN-ID may be used as its identifier. Still alternatively, in the case where different radio access networks are operated by different providers, a PLMN-ID, which is an identifier that identifies a provider from another, may be used.

Figure 5D:
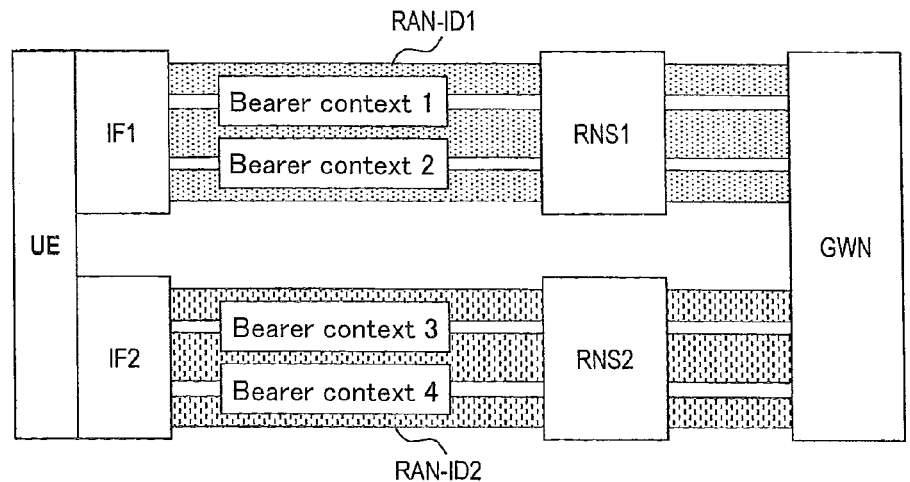
FIG. 5D shows an example of bearer settings at the time of attachment.

The UE 7 sends the GWN 33 a network attachment completion message including the thus-generated bearer identifier table (S111). In response, the GWN 33 registers bearer identifier information included in the received message as the bearer identifier table (S112). FIGS. 4D and 5D show an example of the bearer identifier table and the address setting table, respectively, where RAN-ID1 and RAN-ID2 denote the radio access network identifiers indicating the RNSs (1)1*a* and (2)1*b*, respectively, IP address A and IP address B each denote the IP addresses assigned therein, bearer context 1, bearer context 2, bearer context 3 and bearer context 4 each denote the bearer contexts assigned therein, and two IP bearers are established in each radio access network. Here, the number of IP bearers established in each radio access network is two in this example, but each radio access network needs only to include one or more established IP bearers while the UE 7 attaches thereto. Moreover, the UE 7 includes two radio communication IFs in this example, but may include two or more radio communication IFs, and not all the radio communication IFs need to be attached to the corresponding radio access networks.

HANDOVER EXAMPLE 5

Figure 3F:
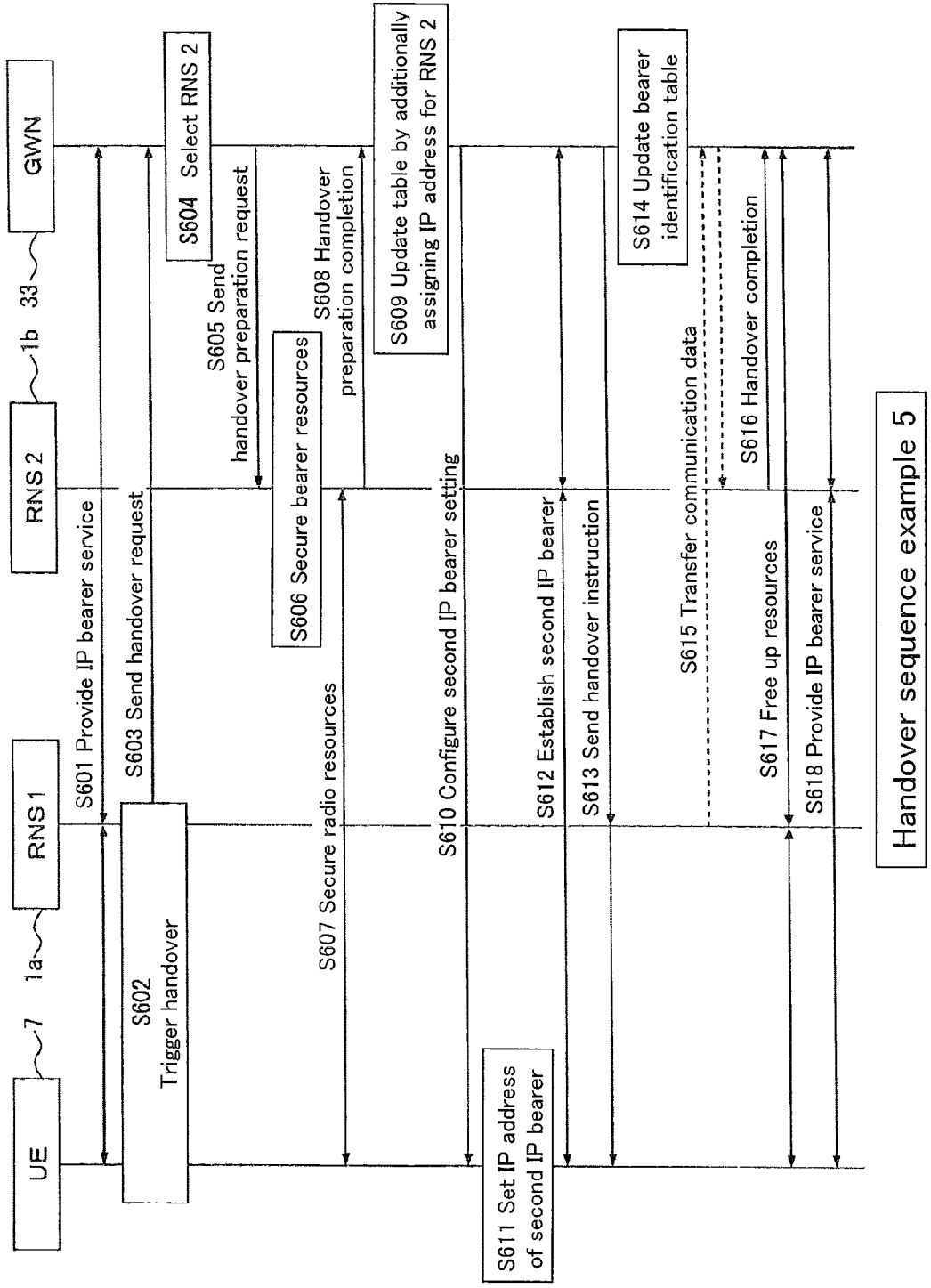
FIG. 3F is a fifth operational sequence diagram at the time of a handover in the mobile communication system according to one of the embodiments.
Figure 5E:
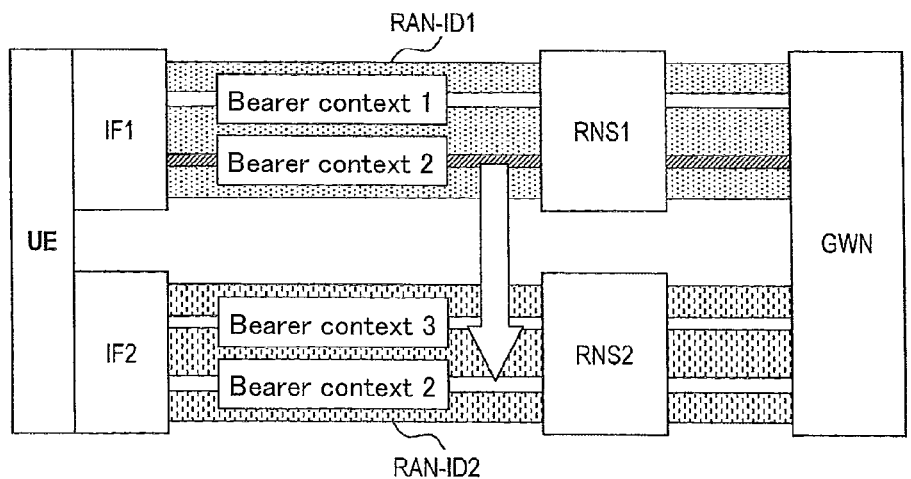
FIG. 5E shows an example of how to change the IP bearer settings in the handover sequences.

Next, with reference to FIGS. 3F and 5E, a description will be given of another example of the operational sequence performed at the time of handover from the RNS (1)1*a* to the RNS (2)1*b* triggered by a handover request message that the UE 7 sends via the RNS (1)1*a* during data communication via the RNS (1)1*a*.

Initially, the IP bearer via the RNS (1)1*a* is established between the UE 7 and the GWN 33, and the UE 7 uses communication services over the IP bearer (S501). Assume here that it is determined to hand over the IP bearer indicated by the bearer context 2 in FIG. 5E from the radio access network of the RNS (1)1*a* to the radio access network of the RNS (2)1*b* (S602). This determination may be made by the RNS (1)1*a* on the basis of information given by the UE 7 on changes in radio conditions surrounding the environment of the UE 7, or may be made autonomously by the user or the UE 7 since factors such as changes in a radio environment accompanying the user's movement either make the radio access network of the RNS (2)1*b* available for connection, or cause deterioration in radio quality of the RNS (1)1*a*. Then, via the RNS (1)1*a*, the UE 7 or the RNS (1)1*a* sends the GWN 33 a handover request including: the bearer context 2 for a handover source IP bearer, and the RAN-ID2, which is an identifier of the handover destination radio access network (S603). Though including the RAN-ID2 in this embodiment, the handover request needs only to include an identifier corresponding to the RAN-ID2 or information for identifying at least a handover source bearer. In response, the GWN 33 selects the RNS (2)1*b* used in the handover destination radio access network 3 (S604) by referring to the received handover request message, and sends the RNS (2)1*b* a handover preparation request message (S605).

The RNS (2)1*b*, specified as a handover destination, secures bearer resources including radio resources in the radio access network (2)3 allocated to the UE 7 (S606).

After the RNS (2)1*b* secures bearer resources in the radio access network (2)3 (S606), a radio bearer is established between the RAN (2)1*b* and the UE 7 (S607). In response, the RNS (2)1*b* sends the GWN 33 a handover preparation completion message (S608).

Upon receiving the handover preparation completion message, the GWN 33 assigns the bearer context 4 to the second bearer newly established via the RNS (2)1*b*, and updates the information in the bearer identification table at the same time (S609). In addition, based on this newly assigned bearer context 4, the GWN 33 configures IP settings on the second IP bearer (S610 and S611).

Upon confirming that the second IP bearer via the RNS (2)1*b* is established (S612), the GWN 33 sends a handover instruction to the RNS (1)1*a*, and to the UE 7 via the RNS (1)1*a* (S613). The handover instruction includes information on the bearer context 2 of the handover source IP bearer and on the bearer context 4 of the handover destination IP bearer. After sending the handover instruction, the GWN 33 updates: the bear context entry for the RAN-ID2 corresponding to the second IP bearer in the bearer identification table (from bear context 4 to bear context 2); packet transfer routing information between the UE 7 and the GWN 33; and information on the IP bearer established in the radio access network (S614). FIGS. 4E and 5E each show an example of how to update information on the second IP bearer newly established in the RNS (2)1*b*.

Here, the description has been given of the procedure in which the bearer context of the handover destination second IP bearer is firstly set to the initial bearer context (bearer context 4), and then updated to the bearer context (bearer context 2) of the handover source IP bearer, in this embodiment. However, the handover destination bearer context (bearer context 2) may be set to the handover source bearer context (bearer context 2) from the outset.

Meanwhile, upon receiving the handover instruction, the RNS (1)1*a* starts transferring, to the RNS (2)1*b* via the GWN 33, communication data addressed to the UE 7 (S615). Depending on the settings on the RNS (1)1*a*, the RAN (1)1*a* may also transfer the communication data from itself to the UE 7 at the same time in order to avoid data loss. Alternatively, the RNS (1)1*a* may transfer the communication data to the RNS (2)1*b* directly, i.e. not via the GWN 33.

Upon start of data transfer, the RNS (2)1*b* sends the GWN 33 a handover completion message indicating completion of the handover processing (S616). Following the handover completion, the GWN 33 frees up the resources in the handover source radio access network (S617). As a result, the IP bearer via the RNS (2)1*b* is established, which makes it possible to provide data communication services using this IP bearer (S618). In addition, at the time of establishing the IP bearer, the UE updates the address setting table in a similar manner to updating the bearer identification table. The bearer identification table and the address setting table may be updated at any timings as long as the updating does not interfere with the handover.

Hereinabove, the description has been given of the operational sequence performed at the time of the handover from the RNS (1)1*a* to the RNS (2)1*b* in this embodiment. However, the handover processing for any handover, such as that from the RNS (2)1*b* to the RNS (1)1*a*, or that to another radio access network, may be implemented using a similar operational sequence. Moreover, the handover processing may be implemented using the operational sequence irrespectively of types of the handover source radio access network and the handover destination radio access network.

Note that, though being two in this embodiment, the number of IP bearers used in each radio access network may be two or more.

Embodiment 2

Figure 1C:
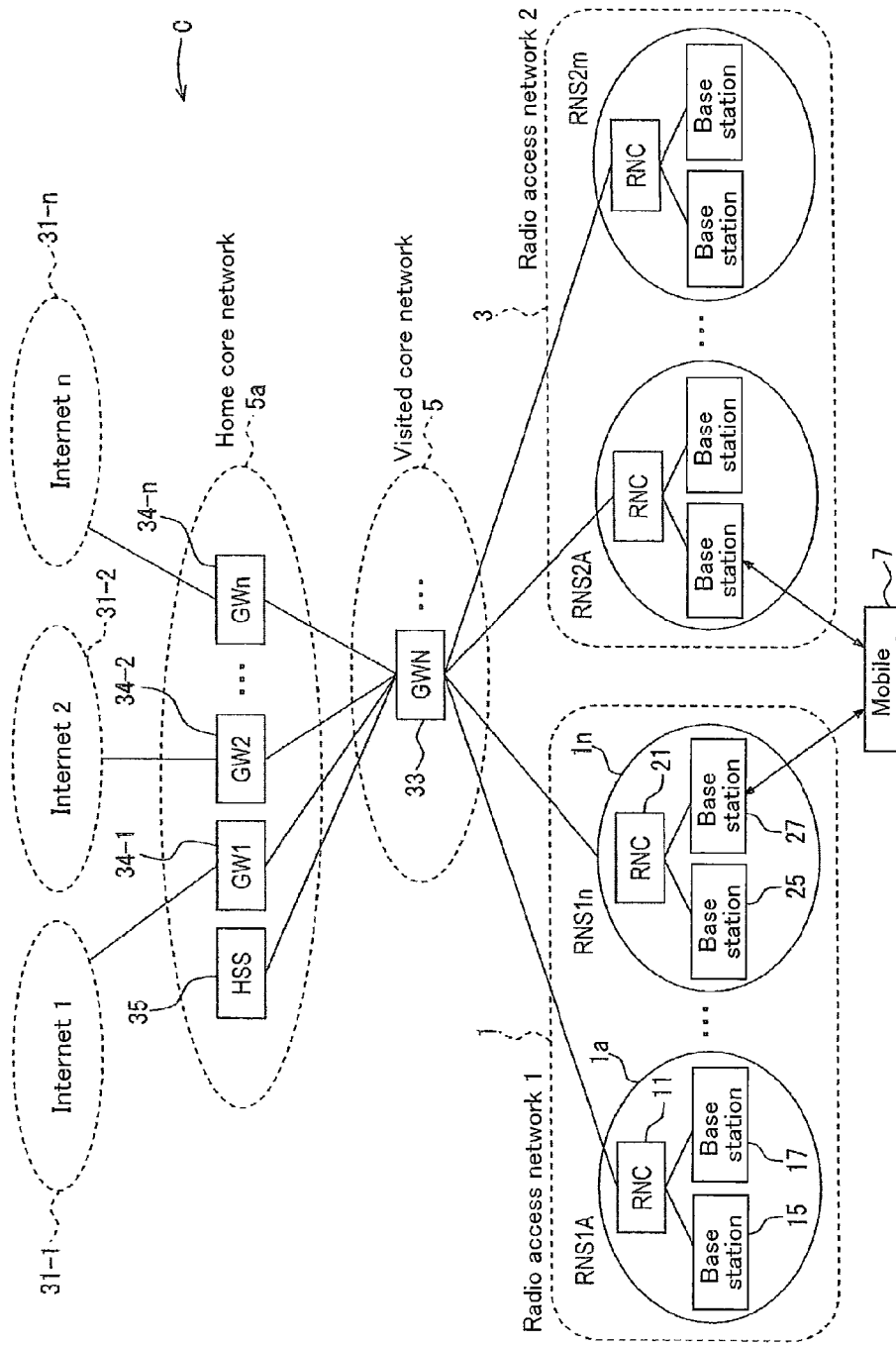
FIG. 1C shows a third network configuration example of a mobile communication system according to an embodiment of the present invention.
Figure 1D:
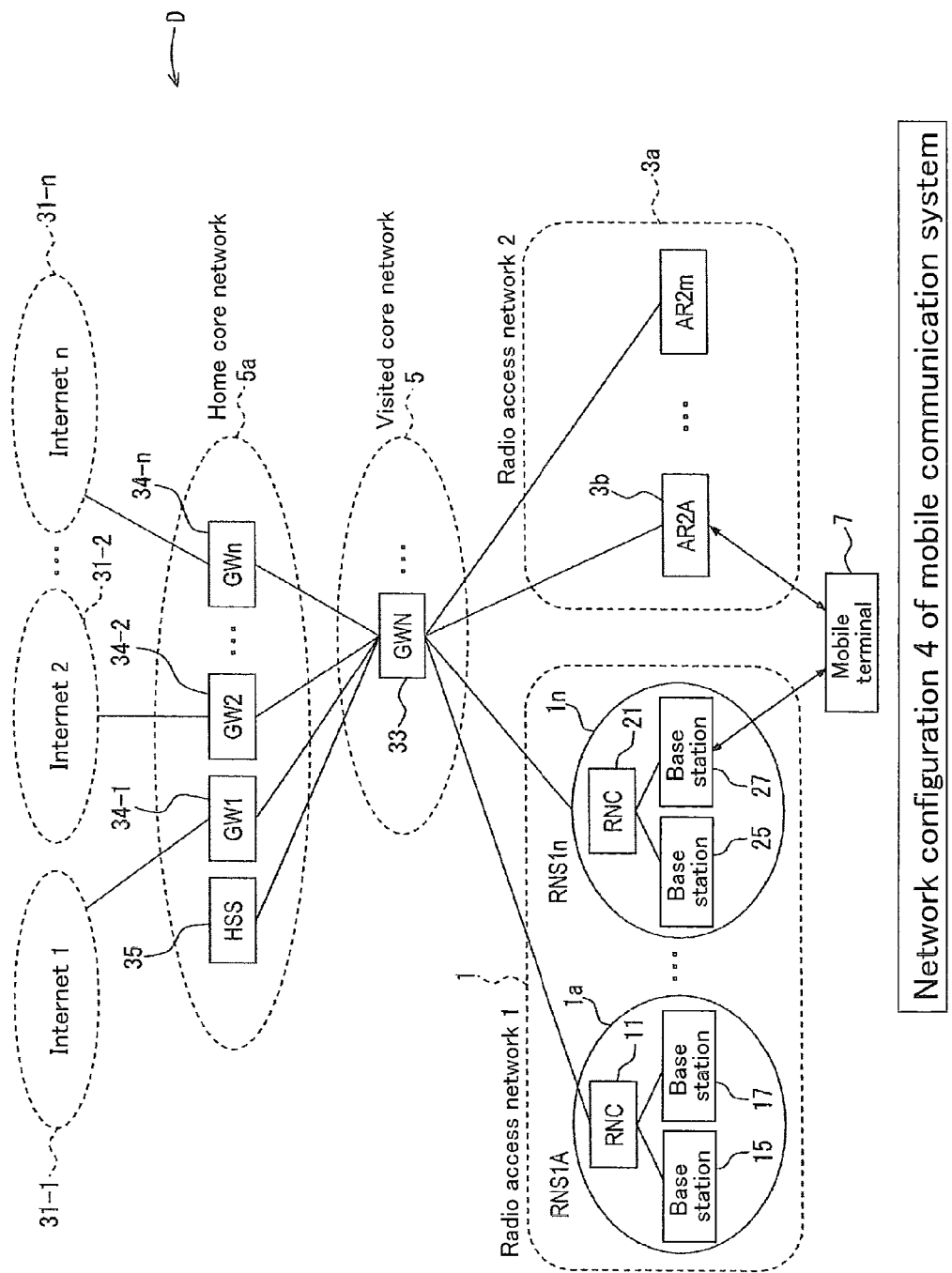
FIG. 1D shows a fourth network configuration example of a mobile communication system according to an embodiment of the present invention.
Figure 1E:
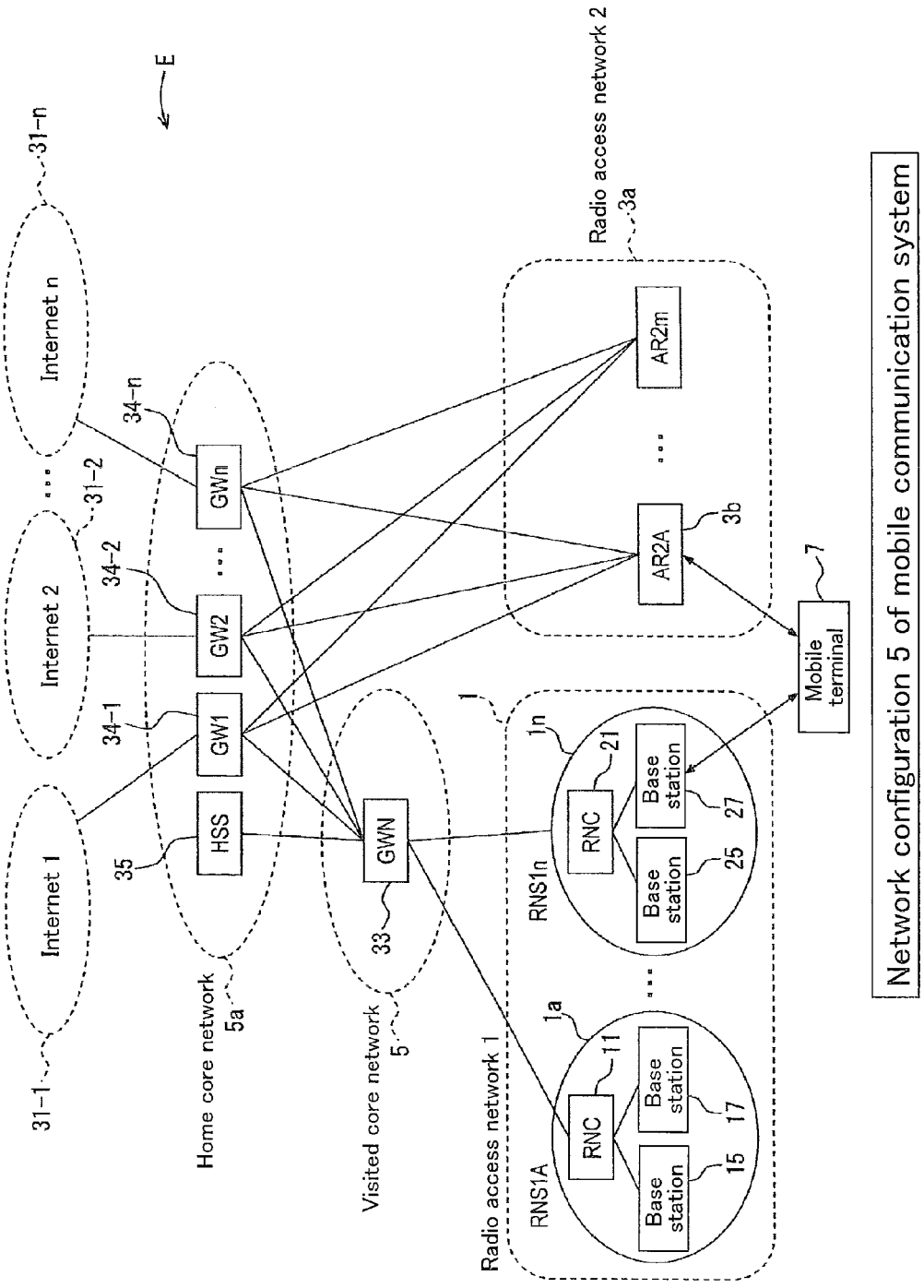
FIG. 1E shows a fifth network configuration example of a mobile communication system according to an embodiment of the present invention.

Next, a description will be given of a different network configuration example of a mobile communication system according to an embodiment of the present invention with reference to FIG. 1C. FIGS. 1C to 1E show different network configuration examples of a mobile communication system provided with gateway devices 34 each connecting the GWN and one of the external IP networks 31. As shown in FIG. 1C, in a mobile communication system C according to this embodiment, a UMTS functional architecture is divided into three parts: radio access networks (1 and 3, a visited core network 5, and a home core network 5*a*.

Radio resources required for requested communication, typified by a certain transmission band, are allocated to each of the radio access networks 1 and 3. Through one of radio access networks 1 and 3 and the GWN 33 of the visited core network 5, user information is transferred between a mobile terminal 7 and an HSS 35 or a GW 34 among GW1 34-1 to GWn 34-*n* in the home core network 5*a*. The GW1 34-1 to GWn 34-*n* are connected to different Internets 31-1 to 31-*n*, respectively. Since different radio communication methods have different radio access networks, the radio communication method used in the first radio access network 1 is different from that in the second radio access network 3. Each of the first and second radio access networks 1 and 3 consists of multiple radio network subsystems (RNSs). Specifically, the first radio access network 1 consists of RNSs 1A to nA, while the second radio access network 3 consists of RNSs 2A1 to 2A*n*. FIGS. 1D and 1E each show another network configuration example of a mobile communication system in which each RNS in the radio access network 2 has a different configuration. In FIGS. 1D and 1E, the RNSs in the radio access network (2)3*a* are access routers (AR) AR2A to AR2*m* (3*b*), respectively. FIG. 1D shows an example in which the ARs 3*b* in the radio access network (2)3*a* are connected to the GWN 33 in the visited core network 5, while FIG. 1E shows an example in which the ARs 3*b* in the radio access network (2)3*a* are connected to the GWs 34-1 to 34-*n* in the home core network 5*a*, respectively.

Figure 2F:
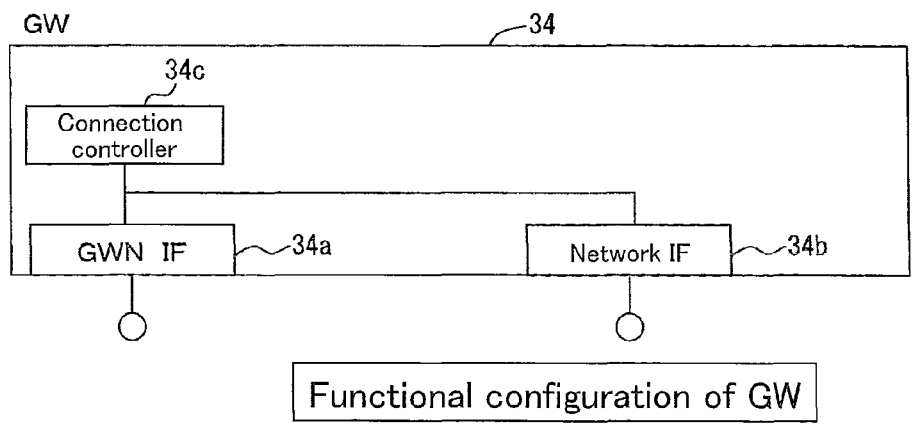
FIG. 2F is a functional block diagram showing a configuration example of a GW according to the embodiments.

Next, a description will be given of a configuration example of the GW 34 according to this embodiment with reference to FIG. 2F. As shown in FIG. 2F, the GW 34 includes: a GWN IF 34*a*, a connection controller 34*c*, and a network IF 34*b*.

The GWN IF 34*a* is an IF connecting the GW 34 and the GWN 33, while the network IF 34*b*, which is an IF connecting the corresponding Internet 31 and the mobile communication system network, allows the UE 7 to communicate with the Internet 31 via the GWN 33.

The connection controller 34*c* manages subscriber information such as billing information, service quality information and a service subscription status. Additionally, based on the subscriber information, the connection controller 34*c* performs data capture and counting for billing purposes, and controls service quality (QoS). The subscriber information is sent by the GWN via the GWN IF 34*a*. Note that the subscriber information may alternatively be acquired by any means other than the GWN.

The configuration examples respectively of the mobile terminal, the RNS 1*a* (1*a* is used as a representative example), the GWN, the subscriber server (HSS) are approximately the same as those described in the foregoing embodiment.

Note that, the system configuration of the mobile communication network implementing the functions of these constituent devices may differ depending on specifications of the mobile communication system, and thus not limited to the above.

ATTACH EXAMPLE 3

Figure 3H:
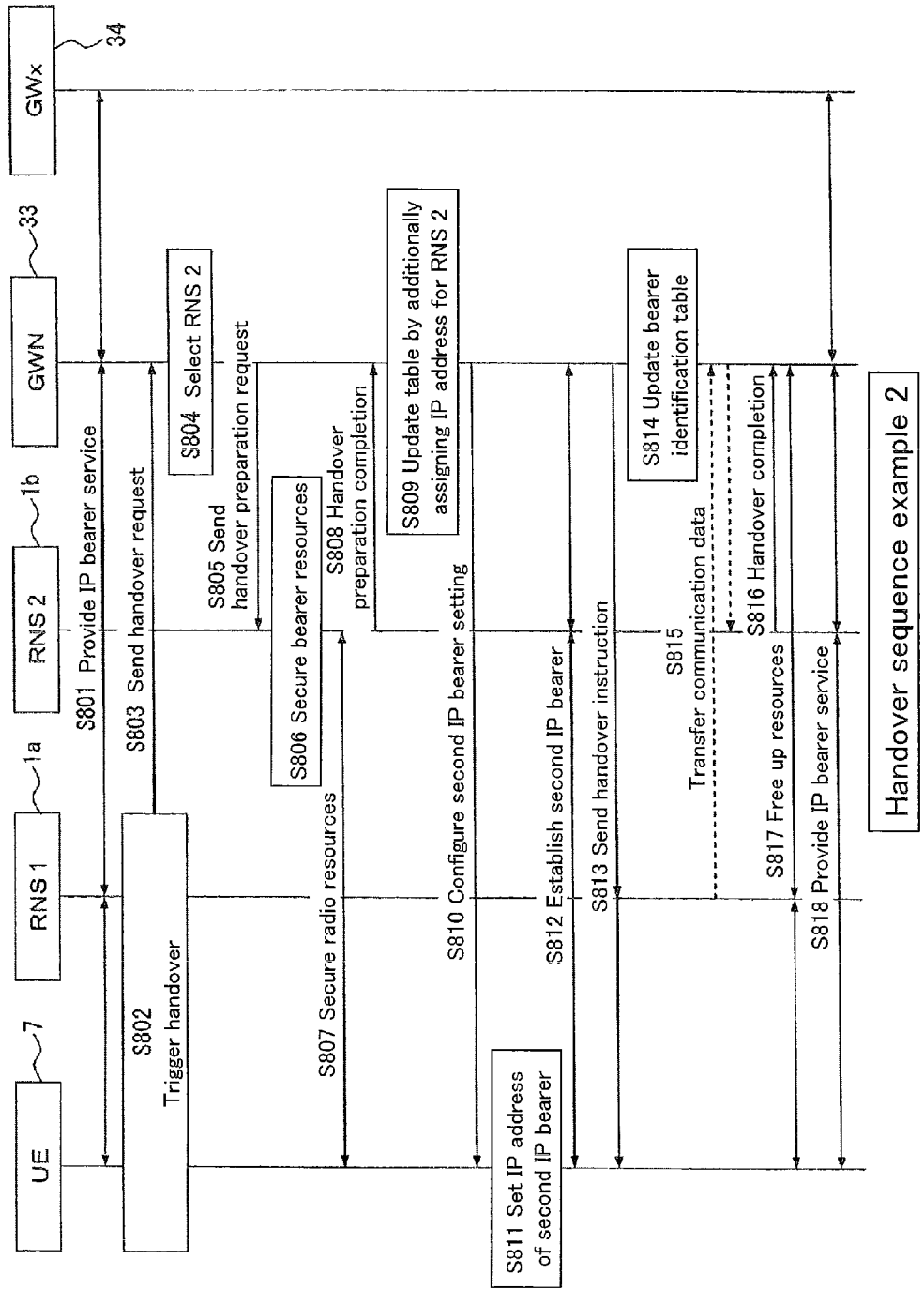
Figure 5F:
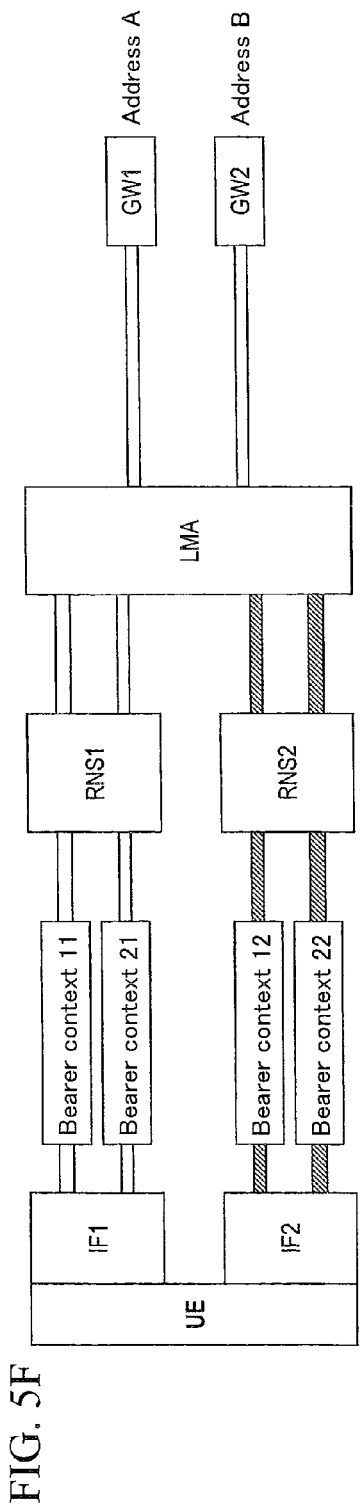
FIG. 5F shows an example of how to change the IP bearer settings (the IP bearer settings before change) in the second and fourth handover sequence examples.
Figure 5G:
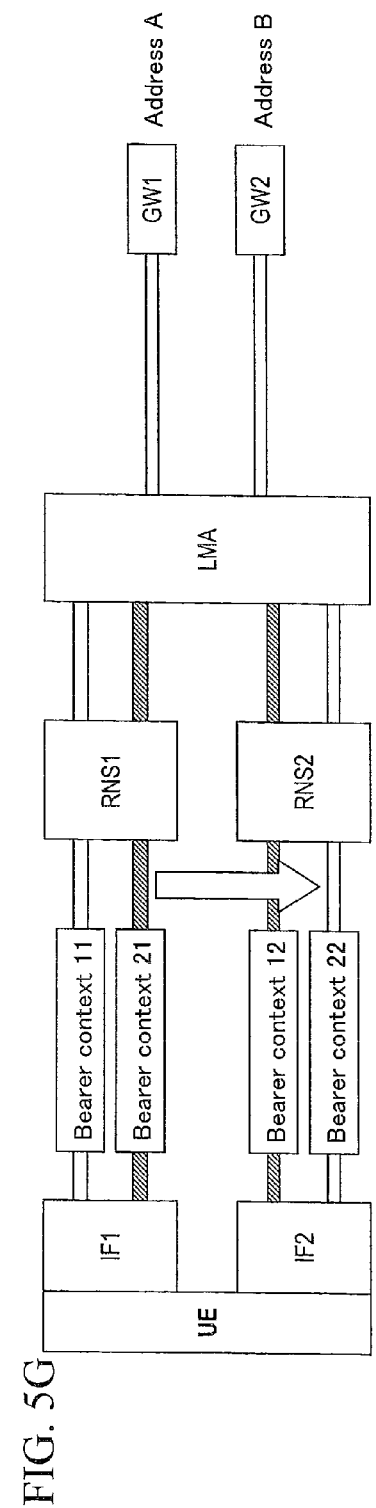
FIG. 5G shows an example of how to change the IP bearer settings (the IP bearer settings after change) in the second and fourth handover sequence examples.
Figure 5H:
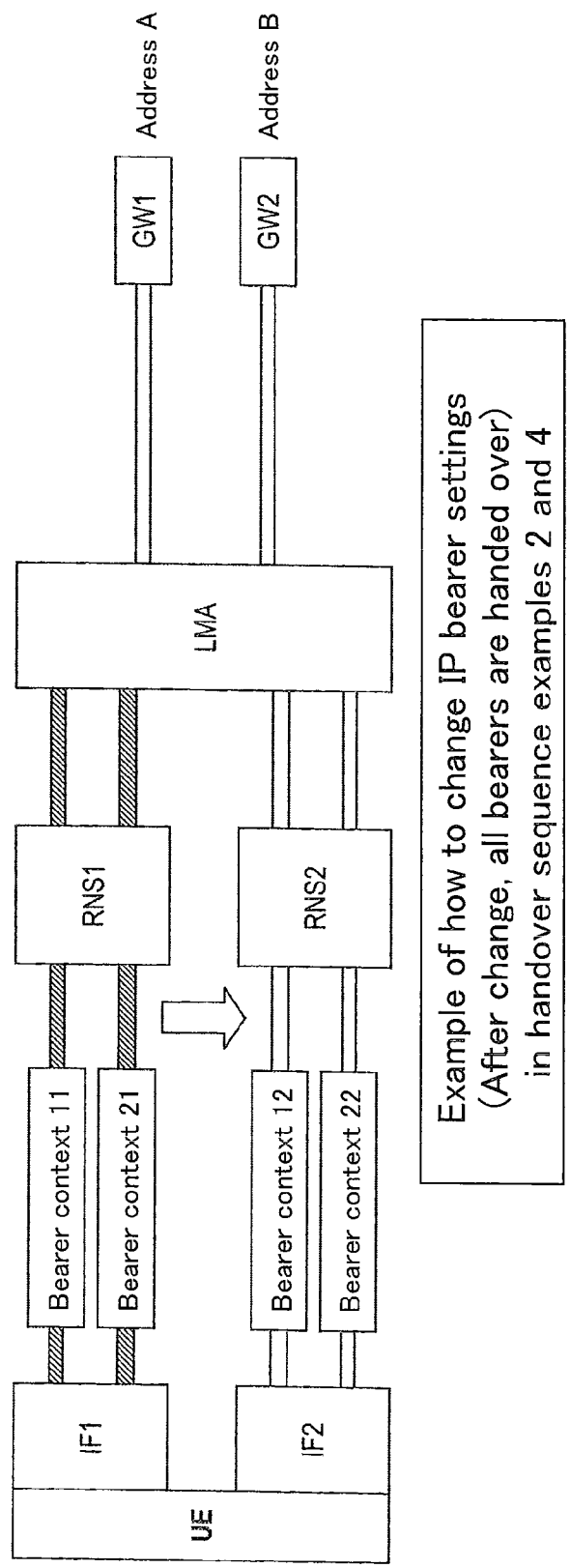
FIG. 5H shows another example of how to change the IP bearer settings (the IP bearer settings after change) in the second and fourth handover sequence examples.

FIG. 3G is a sequence diagram illustrating operations performed by the constituent devices when the UE 7 attaches to (register itself in) the mobile communication system. FIG. 3H is a sequence diagram illustrating operations performed by the constituent devices when a handover trigger is generated via the RNS 1 at the time of a handover from the RNS 1*a* to the RNS 2*a*, for example. FIGS. 5F to 5H are examples of IP bearer settings between the UE and the GWN which are set based on these operational sequences, respectively. In the examples in this embodiment, a handover trigger is generated via the RNS 1. However, the handover trigger may alternatively be generated via the RNS 2 or via whichever radio access network system.

Firstly, a description will be given of the operational sequence performed when the UE 7 attaches to the mobile communication system. The UE 7 includes communication means that enable connection to an RNS (1)1 and to an RNS (2)3, respectively. Note that, since the operational sequence performed when the UE 7 attaches simultaneously to both the RNSs (1)1 and (2)3 is the same as that performed when the UE 7 sequentially attaches to the RNSs (1)1 and (2)3, the operational sequences respectively for the RNSs (1)1 and (2)3 can be illustrated using a single operational sequence diagram regardless of the attaching order, namely, whether the UE 7 attaches simultaneously to both the RNSs or attaches firstly to either one of the RNSs. Accordingly, as shown in FIG. 3G, a single operational sequence diagram is used for illustrating operational sequences respectively for an RNS (1)1a and an RNS (2)1b.

In this embodiment, employed is the case where the UE 7 operates in the two different radio access networks 1 and 3 by using the RNSs (1)1a and (2)1b, as an example. However, even when the UE 7 is attachable to two or more different radio access networks, handovers among the radio access networks can be implemented in a similar procedure.

Firstly, upon being turned on, the UE 7 searches for networks currently available for connection through the respective radio communication IFs (part of S701). In this embodiment, both the radio access networks 5 of the respective RNSs (1)1a and (2)1b are available for connection. Upon finding the available radio access networks 1 and 3 (part of S701), via the corresponding RNSs, the UE 7 sends the GWN 33 attach requests each including information elements such as a UE identifier (UE-ID) and an attach type (S702). Though the attach request including the above information is sent in this example, the attach request may additionally include information on the default IP bearer such as the IP address of the UE 7, an identifier specifying the destination GW, and an address to be assigned to the radio IF.

Then, the GWN 33 registers the UE 7 onto the HSS 35, performs mutual authentication between the user and each network, and registers the GWN 33 onto the HSS 35 (S703). Upon identifying the registration of the GWN 33, the HSS 35 transfers, to the GWN 33, subscriber information for a default IP bearer including authenticated service subscription information and billing information (S704). Then, based on information including this subscriber information and user preferences received from the UE 7, the GWN 33 determines the GW 33 for connecting to one of the PDNs, an IP address to be assigned to the UE 7, and a bearer context to be assigned to the radio IF, and updates the corresponding portion of the bearer identifier table at the same time (S705). Though determined based on the user preferences sent by the HSS 35 in this example, the GW 34 may alternatively be determined based on the policy of the provider managing the mobile network, or may be determined according to the service to be provided, in some cases. Thus, the method for determining the GW 34 is not specifically defined herein. In addition, depending on the provider's operation, the GW 34 might not be determined until communications start. In this case, connection to the GW 34 may be established upon start of communications by using a tentative bearer previously established between the GWN 33 and the UE 7 and assigned a bearer context.

Furthermore, based on the thus-assigned IP address and bearer context, the GWN 33 establishes an IP bearer over which user data is to be transferred between the UE 7 and the GW 34. Then, based on the information sent by the HSS 35 via the GWN 33, the GW 34 adds a default policy, a billing rule and the like to the IP bearer (S706). In this embodiment, the GWN 33 starts to establish the IP bearer, which may be started by either of the UE 7 and the GWN 33, though. Alternatively, communications may be preformed as follows: firstly, a default IP bearer is established between the UE 7 and the GWN 33 when the UE 7 attaches to the mobile communication system; then, in response to a connection request to any of the PDNs 31, an IP bearer to the corresponding GW 34 is established, and the corresponding IP address is assigned to the UE 7.

Once the default IP bearer is established, the GWN 33 provides the RNS 1/2 (1a or 1b) with QoS (Quality of Service) information such as the maximum transfer rate allowed for the default IP bearer. Based on the information, the RNS 1a or 1b controls radio resources therein.

At the same time, the GWN 33 transmits, to the UE 7, a message that the UE 7 is permitted to attach to the mobile access network, as well as information including the assigned IP address and bearer context, and a tentative identifier for identifying the UE 7 such as a TMSI (Temporary Mobile Subscriber Identity) or a P-TMSI (Packet Temporary Mobile Subscriber Identity) (S707). The UE 7 sets the assigned IP address and bearer context in itself, and generates an address setting table consisting of an UE identifier (UE-ID) and interface identifiers (IF-IDs) of the supported radio communication IFs (S708).

In this embodiment as well, a description will be given under assumption that the same identifiers as those in the foregoing embodiment are used to identify the UE 7 and the radio communication IFs.

The UE 7 sends the GWN 33 a network attachment completion message including the thus-generated bearer identifier table (S709). In response, the GWN 33 registers bearer identifier information included in the received message as the bearer identifier table (S710). FIGS. 4F and 5F show an example of the bearer identifier table and the address setting table, and an example of IP bearer settings, respectively, where address A and address B denote the IP addresses for connecting to the GW1 and GW2, respectively, IF-ID1 and IF-ID2 denote the IF-IDs that allow connection to the RNSs (1)1a and (2)1b of the radio access networks, respectively, and bearer context 11, bearer context 21, bearer context 12 and bearer context 22 each denote the bearer contexts assigned therein. Here, each bearer context need only be an identifier indicating connection between the UE 7 and the GWN 35 established via the corresponding radio access network, such as a tunnel identifier indicating a tunnel between the UE 7 and the GWN 35. In the UMTS, a PDP address, a tunnel endpoint identifier and a PDP context are used as the IP address to be assigned to the UE 7, the bearer identifier and the bearer context, respectively.

HANDOVER EXAMPLE 6

Next, with reference to FIGS. 3H, 5F and 5C, a description will be given of another example of the operational sequence performed at the time of handover from the RNS (1)1a to the RNS (2)1b triggered by a handover request message that the UE 7 sends via the RNS (1)1a during data communication via the RNS (1)1a. In this embodiment, two IP bearers, namely a default bearer and a second bearer, are used in each of the radio access network (1)1 and the radio access network (2)3. Note that, though being two in this embodiment, the number of IP bearers used in each radio access network may be two or more.

Initially, the IP bearer via the RNS (1)1a is established between the UE 7 and the GWN 33, and the UE 7 uses communication services over the IP bearer (S801). Assume here that it is determined to hand over the IP bearers indicated by the bearer contexts 11 and 21 in FIG. 5F from the radio access network of the RNS (1)1a to the radio access network of the RNS (2)1b (S802). This determination may be made by the RNS (1)1a on the basis of information given by the UE 7 on changes in radio conditions surrounding the environment of the UE 7, or may be made autonomously by the user or the UE 7 since factors such as changes in a radio environment accompanying the user's movement either make the radio access network of the RNS (2)1b available for connection, or cause deterioration in radio quality of the RNS (1)1a. Then, via the RNS (1)1a, the UE 7 sends the GWN 33 a handover request including: its UE-ID, and the IF-ID of a radio communication means that allows connection to the handover destination radio access network (S803). In this event, the UE 7 may send an identifier that identifies a radio access network or information identifying a bearer context for the handover source bearer, instead of the IF-ID of the radio communication means. The UE 7 needs to send at least information identifying the handover source IP bearer and information identifying the handover destination radio access network. In response, the GWN 33 selects the RNS (2)1b used in the handover destination radio access network 3 (S804) by referring to the received handover request message, and sends the RNS (2)1b a handover preparation request message (S805).

The RNS (2)1b, specified as a handover destination, secures bearer resources including radio resources in the radio access network (2)3 allocated to the UE 7 (S806). After the RNS (2)1b secures bearer resources in the radio access network (2)3 (S806), a radio bearer is established between the RAN (2)1b and the UE 7 (S807). In response, the RNS (2)1b sends the GWN 33 a handover preparation completion message (S808).

Upon receiving the handover preparation completion message, the GWN 33 assigns the bearer context 22 to the second bearer newly established via the RNS (2)1b, and updates the information in the bearer identification table at the same time (S809). In addition, based on this newly assigned bearer context 22, the GWN 33 configures IP settings on the second IP bearer (S810 and S811).

Upon confirming that the second IP bearer via the RNS (2)1b is established (S812), the GWN 33 sends a handover instruction to the RNS (1)1a, and to the UE 7 via the RNS (1)1a (S813). After sending the handover instruction, the GWN 33 updates: the IP address entry for the IF-ID2 corresponding to the second IP bearer in the bearer identification table (from bear context 22 to bear context 21); packet transfer routing information between the UE 7 and the GWN 33; and information on the IP bearer established in the radio access network (S814). FIGS. 4G and 5G each show an example of how to update information on the second IP bearer newly established in the RNS (2)1b.

Here, the description has been given of the procedure in which the bearer context of the handover destination second IP bearer is firstly set to the initial bearer context (bearer context 22), and then updated to the bearer context (bearer context 12) of the handover source IP bearer, in this embodiment. However, the handover destination bearer context (bearer context 22) may be set to the handover source bearer context (bearer context 12) from the outset.

Moreover, though it has been described that some of the IP bearers are handed over in this example, all the IP bearers may be simultaneously handed over based on approximately the same operational sequence as shown in FIGS. 4H and 5H.

Meanwhile, upon receiving the handover instruction, the RNS (1)1a starts transferring, to the RNS (2)1b via the GWN 33, communication data addressed to the UE 7 (S815). Depending on the settings on the RNS (1)1a, the RAN (1)1a may also transfer the communication data from itself to the UE 7 at the same time in order to avoid data loss. Alternatively, the RNS (1)1a may transfer the communication data to the RNS (2)1b directly, i.e. not via the GWN 33.

Upon start of data transfer, the RNS (2)1b sends the GWN 33 a handover completion message indicating completion of the handover processing (S816). Following the handover completion, the GWN 33 frees up the resources in the handover source radio access network (S817). As a result, the IP bearer via the RNS (2)1b is established, which makes it possible to provide data communication services using this IP bearer (S818). In addition, at the time of establishing the IP bearer, the UE updates the address setting table in a similar manner to updating the bearer identification table. The bearer identification table and the address setting table may be updated at any timings as long as the updating does not interfere with the handover.

Hereinabove, the description has been given of the operational sequence performed at the time of the handover from the RNS (1)1a to the RNS (2)1b in this embodiment. However, the handover processing for any handover, such as that from the RNS (2)1b to the RNS (1)1a, or that to another radio access network, may be implemented using a similar operational sequence. Moreover, the handover processing may be implemented using the operational sequence irrespectively of types of the handover source radio access network and the handover destination radio access network.

Note that, though being two in this embodiment, the number of IP bearers used in each radio access network may be two or more.

Each of the foregoing embodiments of a handover has been described as an operational sequence triggered by the UE. However, a handover between the radio access networks triggered by any of the RNSs may also be implemented based on the foregoing operational sequences by adding a step of determining which of the radio access networks the RNS having issued a handover request belongs to.

Note that, though the GWN 33 has been described as an single device in the foregoing embodiments, a system configuration may alternatively employed in which, among the functions of the GWN 33, only the function of connecting to the external IP network is implemented by another separate device placed between the GWN 33 and the external IP network.

Moreover, in the foregoing embodiments, the description has been given of an example case where a single IP bearer is handed over at a time. If there are multiple bearers, some or all of the multiple IP bearers can be simultaneously handed over.

INDUSTRIAL APPLICABILITY

The present invention is applicable to a radio communication system.

The invention claimed is:

1. A mobile communication control system configured by including:
   a mobile terminal connectable to a plurality of radio access networks; and
   an anchor device that connects the plurality of radio access networks to one another,
   the mobile communication control system characterized in that
   the anchor device stores one or more bearers in association with one or more addresses for one mobile station in each radio access network, and has a function of managing the one or more bearers in association with each of the radio access networks, the one or more bearers being among the bearers set up between the mobile terminal and the anchor device, and
   the mobile communication control system makes a bearer handover in a manner of associating, with a second radio access network, one or more bearers among the one or more bearers associated with a first radio access network, including updating the addresses stored in association with the one or more bearers.

2. The mobile communication control system according to claim 1, characterized in that the one or more addresses of the mobile terminal are IP addresses, and the anchor device manages the one or more bearers in association with IP addresses of the mobile terminal, and in making the bearer handover, the mobile communication control system makes an IP address handover in a manner of associating, with the second radio access network, one or more IP addresses associated with the one or more bearers associated with a first radio access network.

3. A mobile communication control system configured by including:
- a mobile terminal connectable to a plurality of radio access networks; and
- an anchor device that connects the plurality of radio access networks to one another,
- the mobile communication control system characterized in that
- the anchor device stores one or more IP addresses of the mobile terminal, and has a function of managing the one or more IP addresses in association with each of the radio access networks, the one or more IP addresses being among the IP addresses set up between the mobile terminal and the anchor device, and
- the mobile communication control system makes an IP address handover in a manner of associating, with a second radio access network, one or more IP addresses among the one or more IP addresses associated with a first radio access network, including updating the stored IP addresses.

4. The mobile communication control system according to claim 1, characterized in that, based on a handover request sent by the mobile terminal, the anchor device controls the bearer handover based on the stored association between one or more bearers and the one or more addresses.

5. The mobile communication control system according to claim 1, characterized in that, based on a handover request sent by one of the radio access network devices, the anchor device controls the bearer handover based on the stored association between one or more bearers and the one or more addresses.

6. The mobile communication control system according to claim 4, characterized in that the handover request includes at least information identifying bearers involved in the handover.

7. The mobile communication control system according to claim 4, characterized in that the handover request includes at least information identifying radio access networks involved in the handover.

8. The mobile communication control system according to claim 1, characterized in that the anchor device manages the one or more bearers in association with an identifier of the mobile terminal.

9. The mobile communication control system according to claim 1, characterized in that the mobile terminal sends information on the bearer handover via the first radio access network device.

10. The mobile communication control system according to claim 1, characterized in that the mobile terminal sends information on the bearer handover via the second radio access network device.

11. The mobile communication control system according to claim 1, characterized in that the mobile terminal sends information on the bearer handover via a third radio access network device.

12. A mobile communication control system configured by including:
- mobile terminals that include a plurality of radio communication means; and
- an anchor device that connects the plurality of radio communication means to one another,
- the mobile communication control system characterized in that
- the anchor device stores addresses for said radio communication means in association with one or more bearers, and has a function of managing the one or more bearers in association with each of the plurality of radio communication means, the one or more bearers being among the bearers set up between the anchor device and the plurality of radio communication means of the mobile terminal, and
- the mobile communication control system makes a bearer handover in a manner of associating, with a second radio communication means, one or more bearers among the one or more bearers associated with a first radio communication means, including updating the addresses stored in association with one or more bearers.

13. A mobile communication control system configured by including:
- mobile terminals that include a plurality of radio communication means; and
- an anchor device that connects the plurality of radio communication means to one another,
- the mobile communication control system characterized in that
- the anchor device stores a plurality of IP addresses for each of the radio communication means, and has a function of managing one or more IP addresses in association with each of the plurality of radio communication means, the one or more IP addresses being among the IP addresses set up between the anchor device and the plurality of radio communication means of the mobile terminal, and
- the mobile communication control system makes an IP address handover in a manner of associating, with a second radio communication means, one or more IP addresses among the one or more IP addresses associated with a first radio communication means, including updating the stored IP addresses.

14. A mobile terminal used in a mobile communication control system configured by including:
- a plurality of radio access network devices each formed of a plurality of radio network subsystems;
- the mobile terminal connectable to the radio access network devices; and
- an anchor device that stores a plurality of addresses for each mobile terminal in association with one or more bearers, and that connects the plurality of radio access network devices to one another,
- the mobile terminal characterized by sending the anchor device a bearer handover request to associate, with a second radio access network, one or more bearers among one or more bearers associated with a first radio access network.

15. A radio network access device used in a mobile communication control system configured by including:
- a plurality of radio access network devices each formed of a plurality of radio network subsystems;
- a mobile terminal connectable to the radio access network devices; and
- an anchor device that stores a plurality of addresses for each mobile terminal in association with one or more bearers, and that connects the plurality of radio access network devices to one another, the radio network access device characterized by sending the anchor device a bearer handover request to associate, with a second radio access network, one or more bearers among one or more bearers associated with a first radio access network.

16. A mobile terminal used in a mobile communication control system configured by including:
  the mobile terminals that include a plurality of radio communication means; and
  an anchor device that stores a plurality of addresses for each mobile terminal in association with one or more bearers, and that connects the plurality of radio communication means to one another,
  the mobile terminal characterized by sending the anchor device a bearer handover request to associate, with a second radio communication means, one or more bearers among one or more bearers associated with a first radio communication means.

17. A mobile terminal used in a mobile communication control system configured by including:
  the mobile terminal connectable to a plurality of radio access networks; and
  an anchor device that stores a plurality of addresses for each mobile terminal in association with one or more bearers, and that connects the plurality of radio access networks to one another,
  the mobile terminal characterized by sending the anchor device an IP address handover request to associate, with a second radio access network, one or more IP addresses among one or more IP addresses associated with a first radio access network.

18. A mobile terminal used in a mobile communication control system configured by including:
  the mobile terminals that include a plurality of radio communication means; and
  an anchor device that stores a plurality of addresses for each mobile terminal in association with one or more bearers, and that connects the plurality of radio communication means to one another,
  the mobile terminal characterized by sending the anchor device an IP address handover request to associate, with a second radio communication means, one or more IP addresses among one or more IP addresses associated with a first radio communication means.

19. The mobile communication control system according to claim 2, characterized in that, based on a handover request sent by the mobile terminal, the anchor device controls the bearer handover based on the stored association between one or more bearers and the one or more addresses.

20. The mobile communication control system according to claim 2, characterized in that, based on a handover request sent by one of the radio access network devices, the anchor device controls the bearer handover based on the stored association between one or more bearers and the one or more addresses.

* * * * *